US010656097B2

(12) United States Patent
Yoshida et al.

(10) Patent No.: US 10,656,097 B2
(45) Date of Patent: May 19, 2020

(54) APPARATUS AND METHOD FOR GENERATING OPERATION PROGRAM OF INSPECTION SYSTEM

(71) Applicant: FANUC CORPORATION, Yamanashi (JP)

(72) Inventors: Junichirou Yoshida, Yamanashi (JP); Fumikazu Warashina, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/894,700

(22) Filed: Feb. 12, 2018

(65) Prior Publication Data

US 2018/0231474 A1    Aug. 16, 2018

(30) Foreign Application Priority Data

Feb. 13, 2017   (JP) .................................. 2017-024201

(51) Int. Cl.
    *G01N 21/89*    (2006.01)
    *G01N 21/88*    (2006.01)
    *G01N 21/95*    (2006.01)

(52) U.S. Cl.
    CPC ......... *G01N 21/89* (2013.01); *G01N 21/8851* (2013.01); *G01N 21/9515* (2013.01); *G01N 2201/10* (2013.01); *Y02P 90/265* (2015.11)

(58) Field of Classification Search
    CPC .................................................... G01N 21/89
    See application file for complete search history.

(56) References Cited

U.S. PATENT DOCUMENTS

| 7,782,451 | B2 * | 8/2010 | Matsumoto ........ G01N 21/9515 |
| | | | 356/237.1 |
| 8,155,789 | B2 * | 4/2012 | Nagatsuka ............. B25J 9/1656 |
| | | | 219/124.34 |
| 8,825,438 | B2 | 9/2014 | Anderson et al. |
| 2005/0171733 | A1 | 8/2005 | Hough |
| 2005/0189657 | A1 | 9/2005 | Beaty et al. |
| 2006/0104788 | A1 * | 5/2006 | Ban ........................ B25J 9/1697 |
| | | | 414/729 |

(Continued)

FOREIGN PATENT DOCUMENTS

| CN | 101034070 A | 9/2007 |
| CN | 104061878 A | 9/2014 |

(Continued)

*Primary Examiner* — Raymond L Nimox
(74) *Attorney, Agent, or Firm* — Hauptman Ham, LLP

(57) ABSTRACT

An apparatus capable of quickly constructing an operation program that causes an inspection system to carry out an operation for imaging the surface to be inspected. This apparatus includes a drawing acquisition section configured to acquire drawing data of the workpiece, a designation receiving section configured to accept designation of the surface to be inspected in the drawing data, a target position acquisition section configured to acquire, as a target position, a position of the movement mechanism when the workpiece and the imaging section are positioned such that the surface to be inspected is within a field of view of the imaging section, and a program generation section configured to generate an operation program for controlling a movement operation of the movement mechanism and an imaging operation of the imaging section on the basis of the target position.

11 Claims, 19 Drawing Sheets

(56) References Cited

U.S. PATENT DOCUMENTS

| | | | | |
|---|---|---|---|---|
| 2006/0165275 A1* | 7/2006 | Horita | ............... | G01B 11/2522 |
| | | | | 382/152 |
| 2007/0211240 A1* | 9/2007 | Matsumoto | ........ | G01N 21/8851 |
| | | | | 356/237.1 |
| 2008/0249659 A1* | 10/2008 | Ueyama | ................ | B25J 9/0018 |
| | | | | 700/245 |
| 2009/0281662 A1* | 11/2009 | Ueyama | ................ | B25J 9/1671 |
| | | | | 700/259 |
| 2010/0067780 A1 | 3/2010 | Kawaragi | | |
| 2010/0256818 A1* | 10/2010 | Aoba | .................... | B25J 9/1612 |
| | | | | 700/275 |
| 2014/0301632 A1* | 10/2014 | Ikeda | ................... | G06T 7/0004 |
| | | | | 382/152 |

FOREIGN PATENT DOCUMENTS

| | | |
|---|---|---|
| DE | 102004007829 A1 | 9/2005 |
| DE | 102007016502 A1 | 10/2008 |
| JP | S63-69244 A | 3/1988 |
| JP | H5-8186 A | 1/1993 |
| JP | H6-175715 A | 6/1994 |
| JP | 7-63537 A | 3/1995 |
| JP | 2005-337797 A | 12/2005 |
| JP | 2008-58111 A | 3/2008 |
| JP | 2016-24104 A | 2/2016 |
| WO | 90/14633 A1 | 11/1990 |
| WO | 02/23292 A2 | 3/2002 |

\* cited by examiner

US 10,656,097 B2

APPARATUS AND METHOD FOR GENERATING OPERATION PROGRAM OF INSPECTION SYSTEM

RELATED APPLICATIONS

The present application claims priority to Japanese Patent Application No. 2017-024201 filed on Feb. 13, 2017, the disclosure of which is hereby incorporated by reference herein in its entirety.

BACKGROUND OF THE INVENTION

1. Field of the Invention

The invention relates to an apparatus and a method for generating an operation program of an inspection system.

2. Description of the Related Art

There have been known inspection systems for inspecting a scratch or the like on a surface of a workpiece (e.g., Japanese Unexamined Patent Publication (Kokai) No. H07-63537).

In the inspection system as described above, there has been a demand for a technique capable of quickly constructing an operation program that causes the inspection system to perform, in order to detect a scratch on a surface to be inspected of the workpiece, an operation of imaging the surface to be inspected.

SUMMARY OF INVENTION

In one aspect of the disclosure, an apparatus, which generates an operation program for workpiece-surface inspection of an inspection system that includes an imaging section configured to image the workpiece and a movement mechanism configured to position the workpiece and the imaging section relative to each other by moving the workpiece or the imaging section, includes a drawing acquisition section configured to acquire drawing data of the workpiece and a designation receiving section configured to receive designation of a surface to be inspected in the drawing data.

The apparatus includes a target position acquisition section configured to acquire, as a target position, a position of the movement mechanism when the workpiece and the imaging section are positioned such that the surface to be inspected is within a field of view of the imaging section, and a program generation section configured to generate an operation program for controlling a movement of the movement mechanism and an imaging of the imaging section, on the basis of the target position.

In another aspect of the disclosure, a method of generating an operation program of an workpiece surface inspection of an inspection system that includes an imaging section configured to image the workpiece and a movement mechanism configured to position the workpiece and the imaging section relative to each other by moving the workpiece or the imaging section, includes acquiring drawing data of the workpiece and receiving designation of a surface to be inspected in the drawing data.

The method includes acquiring, as a target position, a position of the movement mechanism when the workpiece and the imaging section are positioned such that the surface to be inspected is within a field of view of the imaging section and generating an operation program for controlling a movement of the movement mechanism and an imaging of the imaging section, on the basis of the target position.

BRIEF DESCRIPTION OF THE DRAWINGS

An object, features, and advantages of the invention will become more apparent from the following description of embodiments associated with the accompanying drawings.

DETAILED DESCRIPTION

Figure 1:
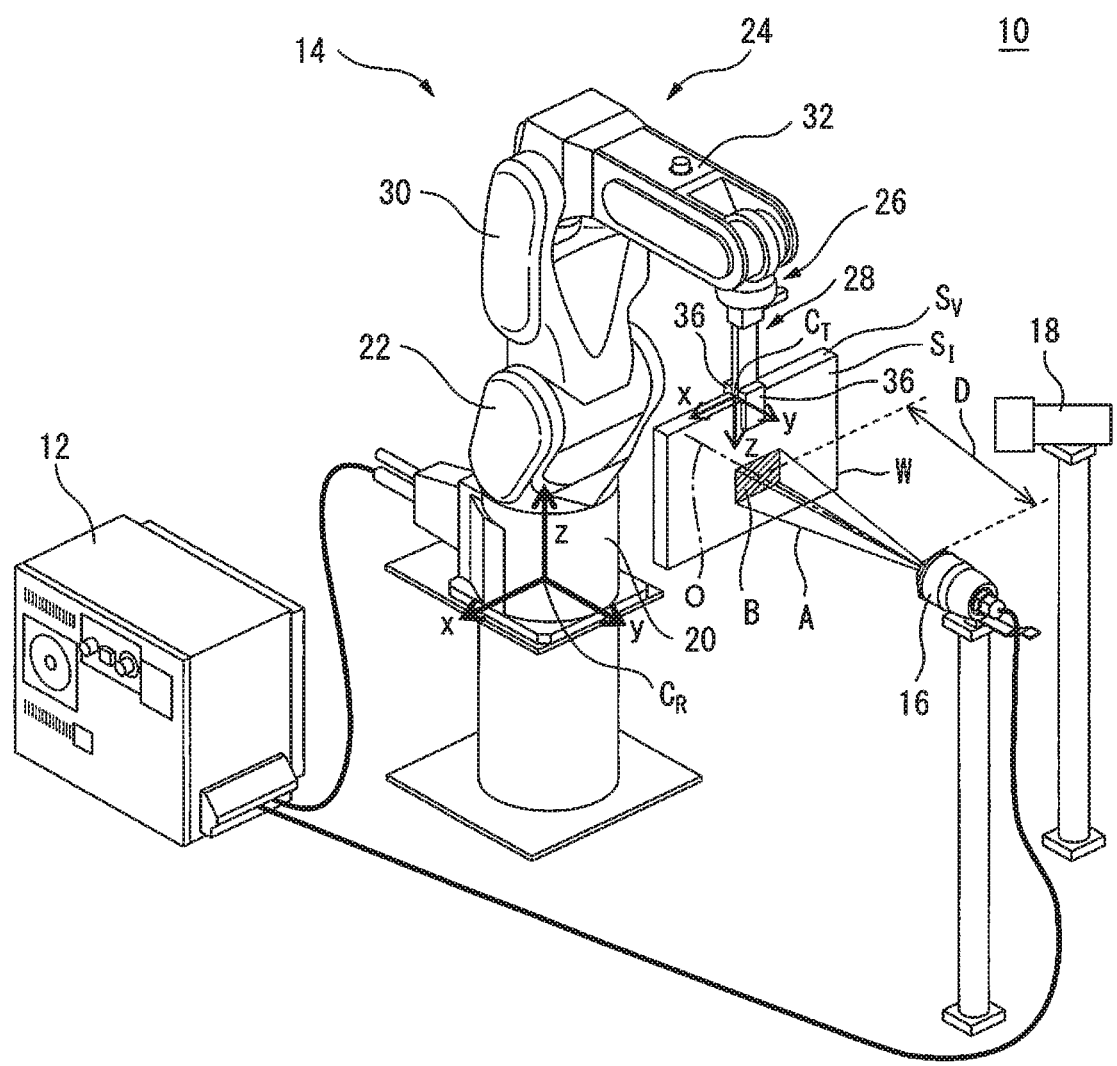
FIG. 1 is a perspective view of an inspection system according to one embodiment.

Embodiments of the disclosure are described below in detail on the basis of the drawings. In various embodiments described below, similar elements are denoted by the same reference numerals, and redundant descriptions thereof will be omitted. First, referring to FIG. 1 to FIG. 3, an inspection system 10 according to an embodiment is described.

Figure 2:
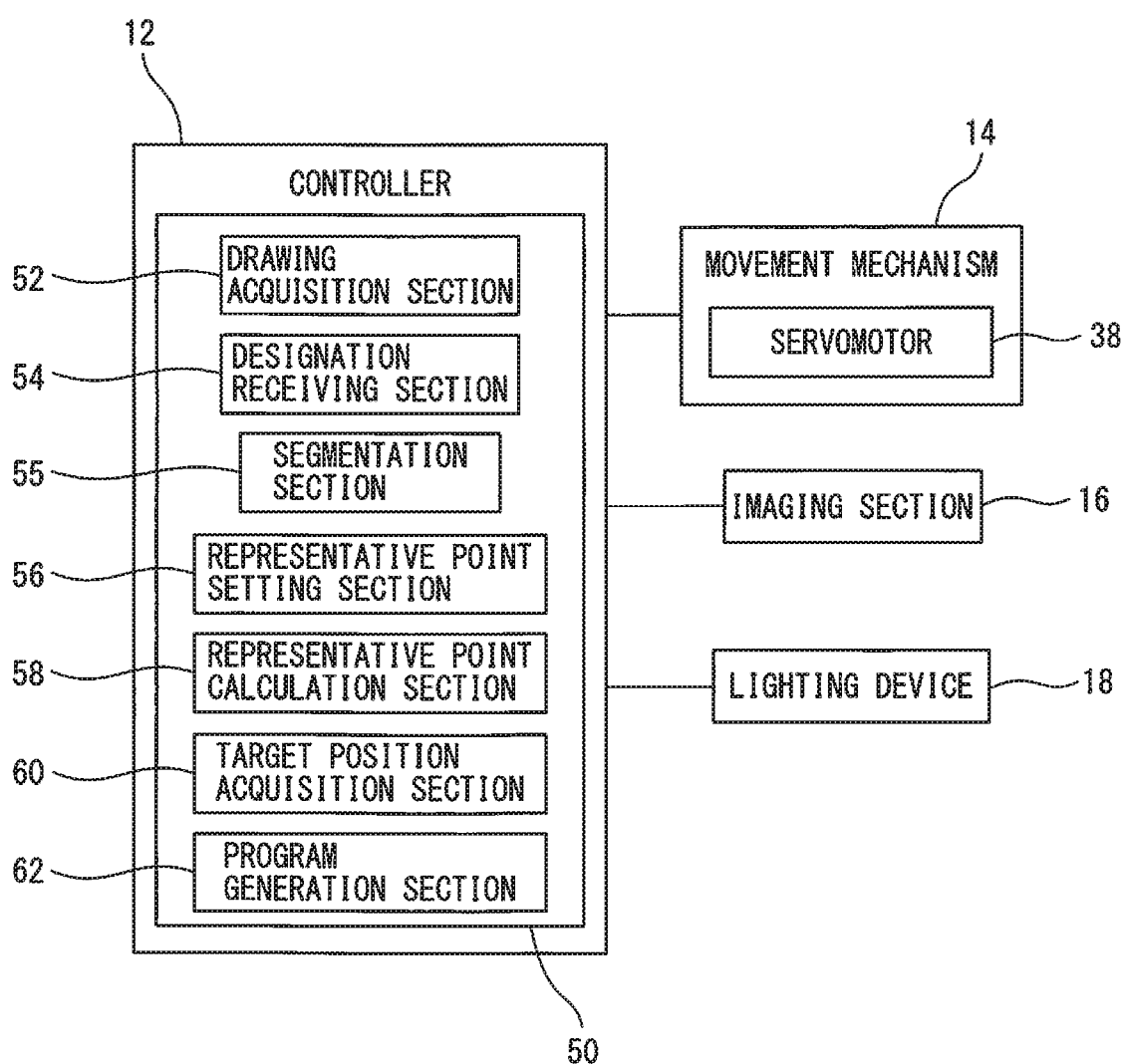
FIG. 2 is a block diagram of the inspection system illustrated in FIG. 1.

The inspection system 10 includes a controller 12, a movement mechanism 14, an imaging section 16, a lighting device 18, and an operation program generation device 50 (FIG. 2). The controller 12 includes a CPU, a storage (not illustrated) and the like, and controls the movement mechanism 14, the imaging section 16, and the lighting device 18.

In this embodiment, the movement mechanism 14 is a vertical articulated robot, and includes a robot base 20, a revolving drum 22, a robotic arm 24, a wrist 26, and a robotic hand 28. The robot base 20 is fixed on a floor of a work cell. The revolving drum 22 is mounted at the robot base 20 so as to be rotatable about a vertical axis.

The robotic arm 24 includes an upper arm 30 rotatably connected to the revolving drum 22 and a forearm 32 rotatably connected to a distal end of the upper arm 30. The wrist 26 is attached to a distal end of the forearm 32 and supports the robotic hand 28 so as to be rotatable about three axes.

Figure 3:
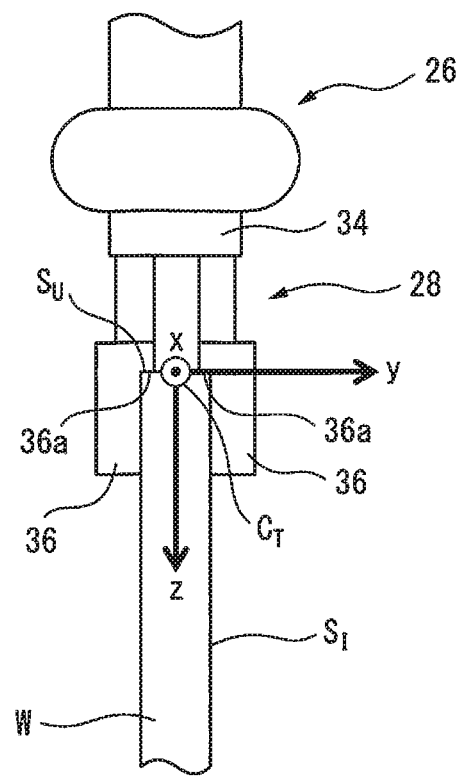
FIG. 3 is a diagram illustrating a state in which a workpiece is gripped by a robotic hand illustrated in FIG. 1.

As illustrated in FIG. 3, the robotic hand 28 includes a hand base 34, a plurality of fingers 36, and a finger driving section (not illustrated). The hand base 34 is connected to the wrist 26. The plurality of fingers 36 are provided at the hand base 34 so as to open and close.

The plurality of fingers 36 extend from the hand base 34 toward one side and include stepped portions 36a on surfaces opposing to each other. When the robotic hand 28 grips a workpiece W, an upper face $S_U$ of the workpiece W engages the stepped portions 36a. The finger driving section is e.g. an air cylinder, and built in the hand base 34. The finger driving section opens and closes the fingers 36 in response to a command from the controller 12.

The movement mechanism 14 includes a plurality of servomotors 38 (FIG. 2). The servomotors 38 are respectively built in the revolving drum 22, the robotic arm 24 and the wrist 26 of the movement mechanism 14, and drives these components in response to commands (speed command, torque command, etc.) from the controller 12.

As one of the coordinate systems of automatic control for controlling each component of the movement mechanism 14, a robot coordinate system $C_R$ (FIG. 1) is set. The controller 12 operates each component of the movement mechanism 14 with reference to the robot coordinate system $C_R$. For example, the z-axis of the robot coordinate system $C_R$ is parallel to a vertical direction in a real space, wherein the revolving drum 22 is rotated about the z-axis of the robot coordinate system $C_R$.

On the other hand, a tool coordinate system $C_T$ is set for the robotic hand 28. The tool coordinate system $C_T$ is one of the coordinate systems for automatic control, and a position and orientation of the robotic hand 28 in a space are defined by expressing a position and orientation of the tool coordinate system $C_T$ in the robot coordinate system $C_R$.

As illustrated in FIG. 3, in this embodiment, the tool coordinate system $C_T$ is set such that an origin of the tool coordinate system $C_T$ is positioned between the stepped portions 36a of the fingers 36, the fingers 36 extend from the hand base 34 in a z-axis plus direction of the tool coordinate system $C_T$, and the fingers 36 open and close in the y-axis direction of the tool coordinate system $C_T$.

The controller 12 operates the revolving drum 22, the robotic arm 24, and the wrist 26 in the robot coordinate system $C_R$ such that the position and orientation of the robotic hand 28 coincides with the position and orientation defined by the tool coordinate system $C_T$. Thus, the robotic hand 28 is arranged in an arbitrary position and orientation in the robot coordinate system $C_R$.

The imaging section 16 is fixed at a predetermined position, and includes an optical system such as a focus lens and an imaging sensor such as a CCD sensor or a CMOS sensor. The imaging section 16 images an object such as the workpiece W in response to a command from the controller 12, and transmits the captured image to the controller 12.

A position at which the imaging section 16 is fixed and an optical axis O of the imaging section 16 (i.e., an optical path of a subject image incident on the optical system of the imaging section 16) are expressed as coordinates in the robot coordinate system $C_R$, and pre-stored in the storage of the controller 12. Thereby, the controller 12 can recognize positions of the imaging section 16 and the optical axis O in the robot coordinate system $C_R$.

The lighting device 18 includes an incandescent lamp, a fluorescent lamp, an LED, or the like, and is fixed at a predetermined position. The lighting device 18 turns ON/OFF in response to a command from the controller 12, and irradiates the workpiece W gripped by the movement mechanism 14 with light when it is turned ON.

Next, an operation of inspecting a surface $S_I$ to be inspected of the workpiece W (i.e., operation of workpiece-surface inspection) by the inspection system 10 will be described. First, the controller 12 operates the movement mechanism 14 so as to grip the workpiece W stored in a predetermined storage location by the robotic hand 28.

Then, the controller 12 operates the movement mechanism 14 so as to move the workpiece W by the movement mechanism 14 to a position at which the optical axis O of the imaging section 16 orthogonally crosses the surface $S_I$ to be inspected, and positions the workpiece W with respect to the imaging section 16. At this time, the imaging section 16 and the surface $S_I$ to be inspected are positioned such that they are spaced apart by a distance D.

Thus, in this embodiment, the movement mechanism 14 positions the workpiece W and the imaging section 16 relative to each other. FIG. 1 illustrates an example of a state in which the workpiece W and the imaging section 16 are positioned such that the optical axis O of the imaging section 16 is orthogonally crosses the surface $S_I$ to be inspected.

The controller 12 then transmits a command to the lighting device 18 so as to turn the lighting device 18 ON. By this operation, the workpiece W gripped by the movement mechanism 14 is illuminated by the lighting device 18.

The controller 12 then transmits an imaging command to the imaging section 16. When receiving the imaging command from the controller 12, the imaging section 16 images the surface $S_I$ of the workpiece W. The imaging section 16 has a viewing angle indicating a range that can be captured.

The viewing angle depends on a design of the optical system of the imaging section 16. More specifically, the longer the focal length of a lens of a camera, or the smaller the light receiving surface of the imaging section, the narrower the viewing angle.

An example of the viewing angle of the imaging section 16 is illustrated as a virtual line A in FIG. 1. The viewing angle A and the aforementioned distance D determine a range B on the surface $S_I$ that can be captured by the imaging section 16 (hereinafter, referred to as a "FOV (Field-Of-View) size") when the workpiece W and the imaging section 16 are positioned as illustrated in FIG. 1. In addition, a resolution of the image to be imaged by the imaging section 16 and the FOV size are inversely proportional, and the smaller the FOV size, the higher the resolution of the obtained image.

The controller 12 repeatedly carries out the operations of moving the workpiece W by the movement mechanism 14 and imaging the surface $S_I$ by the imaging section 16, so as to image the entire area of the surface $S_I$ by the imaging section 16.

Thus, the controller 12 acquires the image of the entire area of the surface $S_I$ to be inspected. The controller 12 then analyzes the image of the surface $S_I$ received from the imaging section 16, and detects a defect such as a scratch mark formed on the surface $S_I$.

The storage of the controller 12 pre-stores an operation program that causes the controller 12 to carry out the above-mentioned operation of workpiece-surface inspection. The operation program generation device 50 according to this embodiment automatically generates such operation program.

The operation program generation device 50 includes a drawing acquisition section 52, a designation receiving section 54, a segmentation section 55, a representative point setting section 56, a representative point calculation section 58, a target position acquisition section 60, and a program generation section 62. Note that, the operation program generation device 50 is mounted in the controller 12 in this embodiment.

Therefore, the controller 12 functions as the drawing acquisition section 52, the designation receiving section 54, the segmentation section 55, the representative point setting section 56, the representative point calculation section 58, the target position acquisition section 60, and the program generation section 62 as described later.

Figure 4:
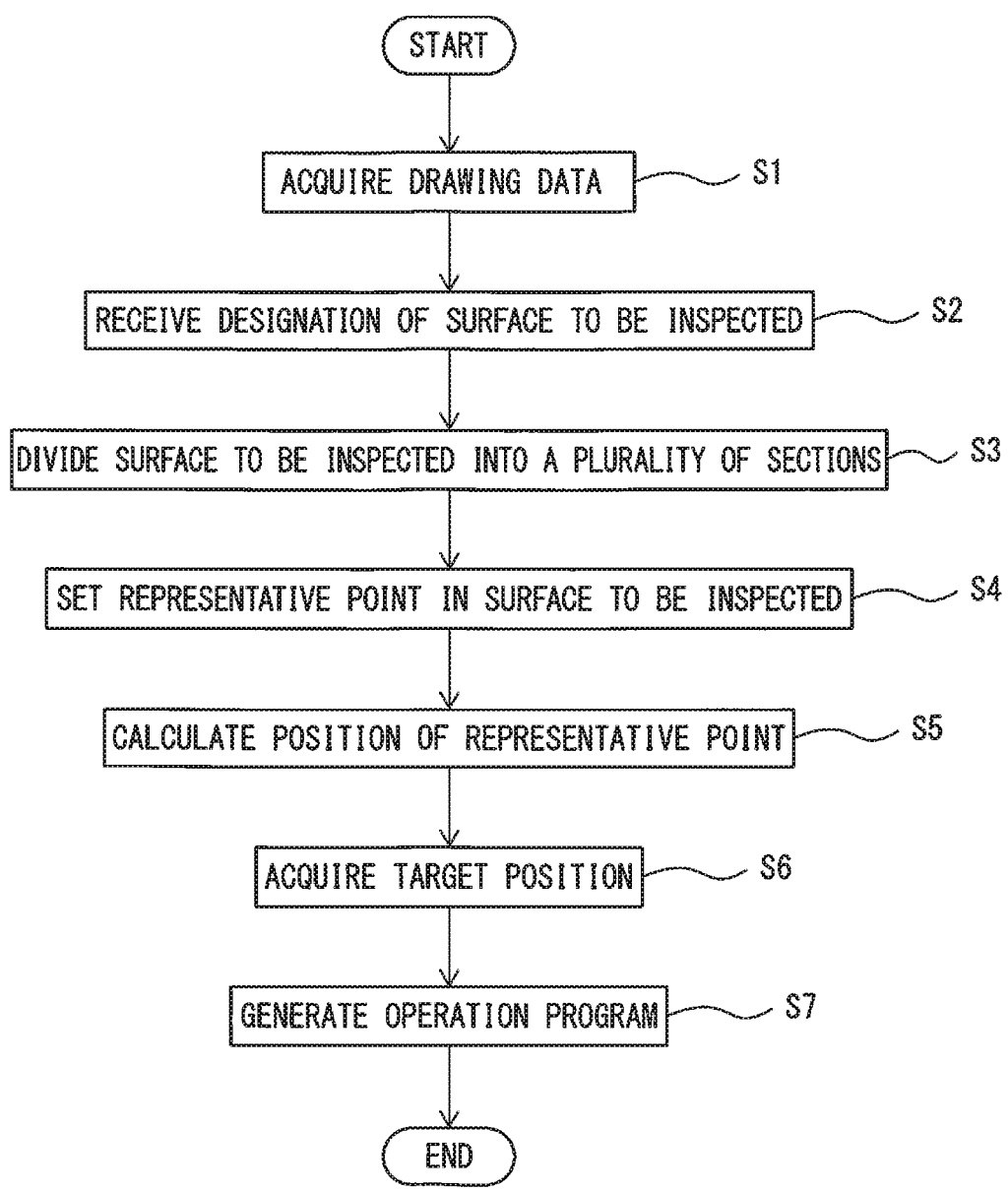
FIG. 4 is a flowchart illustrating an example of an operation sequence of an operation program generation device illustrated in FIG. 2.
Figure 5:
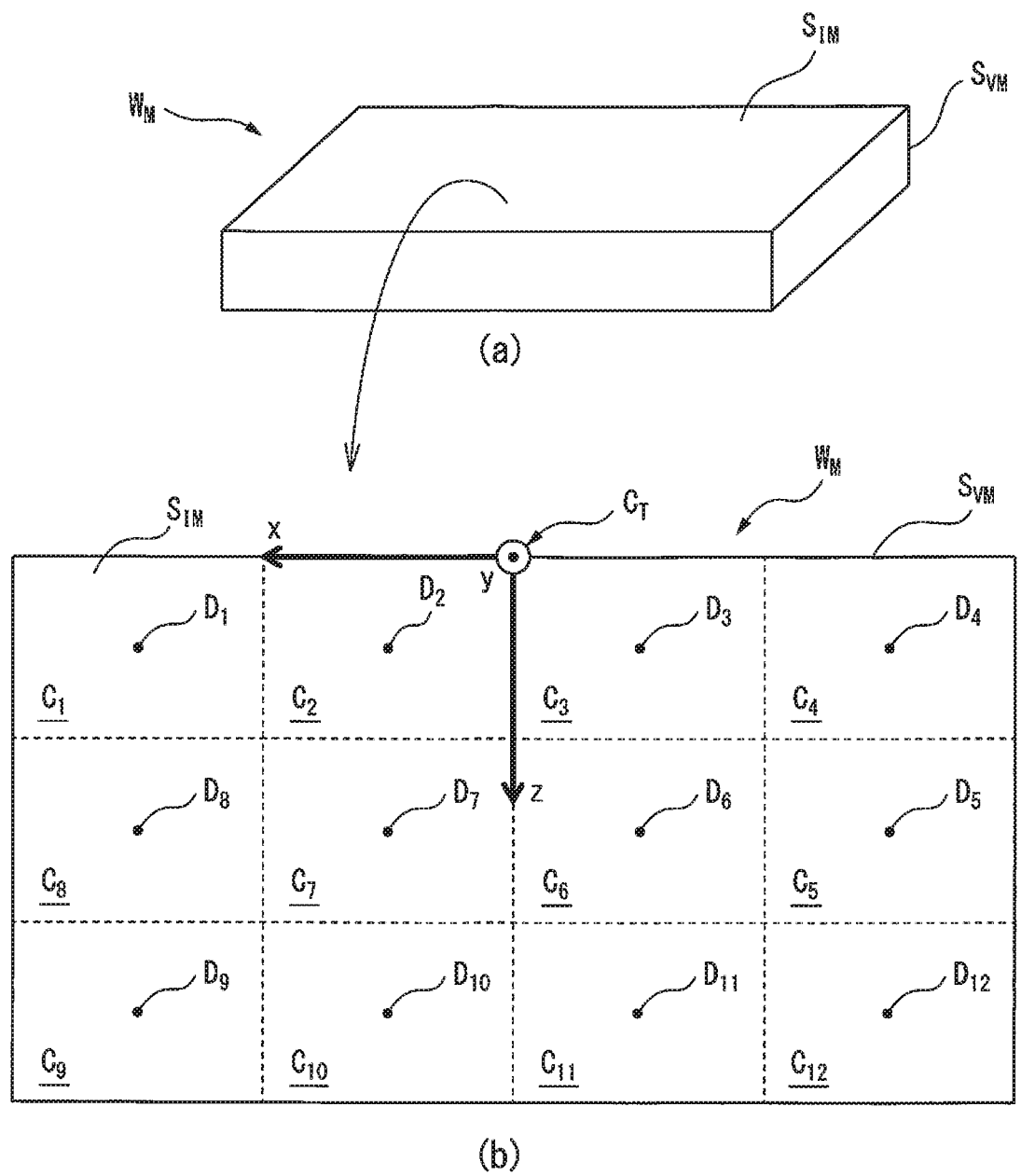
FIG. 5 are diagrams for describing steps 1 to 3 in FIG. 4: Section (a) in FIG. 5 illustrates an example of drawing data of the workpiece; Section (b) in FIG. 5 illustrates a state in which a model of a surface to be inspected illustrated in Section (a) in FIG. 5 is divided into a plurality of sections.
Figure 6:
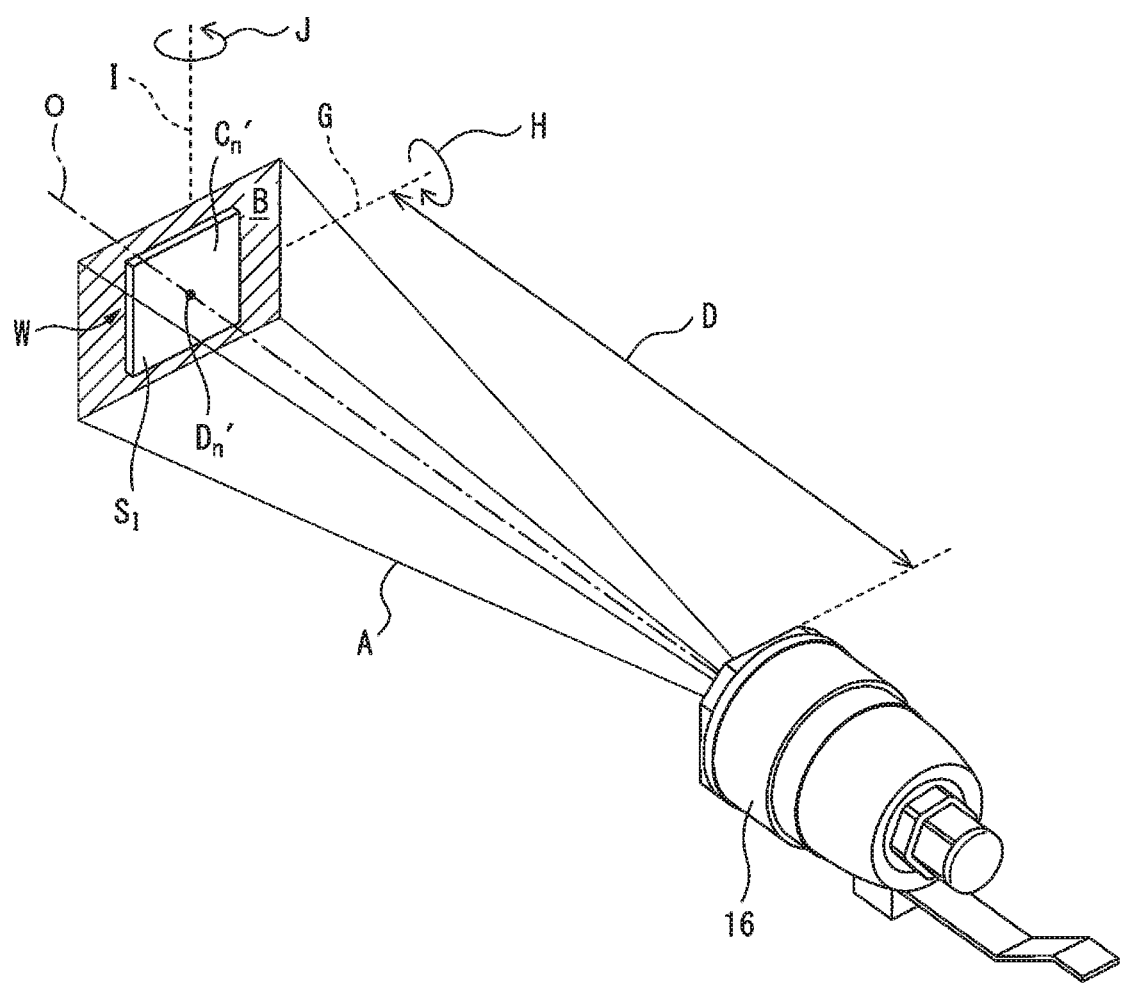
FIG. 6 is a diagram for describing step S6 in FIG. 4.

Referring to FIG. 4 to FIG. 6, an operation sequence of the operation program generation device 50 will be described below. The sequence illustrated in FIG. 4 is started when the controller 12 receives an operation program generation command from an operator.

At step S1, the controller 12 acquires drawing data (e.g., 2D CAD data, or 3D CAD data) of the workpiece W. As an example, the drawing data of the workpiece W is stored in an external server installed outside of the controller 12 so as to be able to communicate the controller 12. In this case, the controller 12 accesses the external server in this step S1 so as to download the drawing data of the workpiece W from the external server.

As another example, the drawing data of the workpiece W is stored in an external memory such as an EEPROM (a registered trademark). In this case, the controller 12 has an I/O port (e.g., a USB port) into which the external memory is detachably inserted. At this step S1, the operator inserts the external memory into the I/O port of the controller 12 and downloads the drawing data of the workpiece W from the external memory on the controller 12.

As still another example, the drawing data of the workpiece W is pre-stored in the storage of the controller 12. In this case, the controller 12 reads out the drawing data of the workpiece W stored in the storage at this step S1.

Thus, in this embodiment, the controller 12 functions as the drawing acquisition section 52 configured to acquire the drawing data of the workpiece.

An example of the drawing data of the workpiece W acquired at step S1 is illustrated in Section (a) in FIG. 5. In the example illustrated in Section (a) in FIG. 5, a workpiece model $W_M$ of 3D CAD data is illustrated. Below, a case where the workpiece model $W_M$ illustrated in Section (a) in FIG. 5 is acquired at step S1 will be described.

At step S2, the controller 12 receives designation of the surface $S_I$ to be inspected in the drawing data of the workpiece W. As an example, the controller 12 is provided with a display such as an LCD or an OLED, and an operation part such as a keyboard or a touch screen.

The operator operates the operation part so as to designate a surface model $S_{IM}$ in the workpiece model $W_M$, which corresponds to the surface $S_I$ to be inspected, displayed on the display. The controller 12 receives the operation on the operation part by the operator, thereby receives the designation of the surface model $S_{IM}$.

Thus, in this embodiment, the controller 12 functions as the designation receiving section 54 configured to receive the designation of the surface $S_I$ to be inspected (i.e., the surface model $S_{IM}$) in the drawing data.

At step S3, the controller 12 divides the surface $S_I$ to be inspected designated at step S2 into a plurality of sections. For example, the controller 12 divides the surface model $S_{IM}$ designated at step S2 as illustrated in Section (b) in FIG. 5.

In an example illustrated in Section (b) in FIG. 5, the surface model $S_{IM}$ is divided into a total of 12 sections $C_1$ to $C_{12}$ in the drawing data. The controller 12 determines the number of the sections $C_1$-$C_{12}$ and the size of each of the sections $C_1$-$C_{12}$ depending on the aforementioned FOV size B, and automatically divides the surface model $S_{IM}$ into the sections $C_1$ to $C_{12}$.

As described above, the FOV size B is determined by the viewing angle A of the imaging section 16 and the distance D between the imaging section 16 and the surface $S_I$ to be inspected. For example, the controller 12 determines the number of the sections $C_1$-$C_{12}$ and the size of each of the sections $C_1$-$C_{12}$ such that the size (i.e., the area) of each of the sections $C_1$-$C_{12}$ is not larger than the FOV size B. The distance D is predetermined by the operator and stored in the storage of the controller 12.

Thus, in this embodiment, the controller 12 functions as the segmentation section 55 configured to divide the surface $S_I$ to be inspected (i.e., the surface model $S_{IM}$) into the plurality of sections $C_1$ to $C_{12}$.

At step S4, the controller 12 sets representative points in the surface $S_I$ to be inspected. More specifically, the controller 12 sets one representative point $D_n$ in each of the sections $C_n$ (n=1 to 12) divided at step S3, as illustrated in Section (b) in FIG. 5.

In this embodiment, the representative point $D_n$ is set as a center point of the section $C_n$. In this way, the controller 12 automatically sets the representative points $D_1$ to $D_{12}$ in the respective sections $C_1$ to $C_{12}$ in the drawing data. Thus, in this embodiment, the controller 12 functions as the representative point setting section 56 configured to set the representative points $D_n$.

At step S5, the controller 12 calculates positions of the representative points $D_n$ (n=1 to 12) set at step S4. As an example, the operator operates the operation part of the controller 12 so as to designate a position on the workpiece W (workpiece position) at which the robotic hand 28 grips the workpiece W in the drawing data.

The workpiece position is determined by a position of the tool coordinate system $C_T$ set by the controller 12 when the robotic hand 28 grips the workpiece W. Therefore, the operator designates a position of the origin of the tool coordinate system $C_T$ in the workpiece model $W_M$ displayed on the display of the controller 12.

Below, it is assumed that the operator designates the position of the origin of the tool coordinate system $C_T$ at the center of an upper face model SUM of the workpiece model $W_M$ as illustrated in Section (b) in FIG. 5. In this case, when the robotic hand 28 grips the workpiece W stored in the storage location, the controller 12 sets the tool coordinate system $C_T$ with respect to the workpiece W such that the origin of the tool coordinate system $C_T$ is positioned at the center of the upper face $S_U$ of the workpiece W and the x-z plane of the tool coordinate system $C_T$ is parallel to the surface $S_I$ to be inspected.

Then, the controller 12 operates the movement mechanism 14 so as to arrange the robotic hand 28 at a position and orientation defined by the set tool coordinate system $C_T$, and grips the workpiece W by the robotic hand 28. As a result, the robotic hand 28 grips the workpiece W at the workpiece position corresponding to the tool coordinate system $C_T$ designated by the operator, as illustrated in FIG. 1 and FIG. 3.

The controller 12 receives the operation on the operation part by the operator to receive the designation of the origin-position of the tool coordinate system $C_T$. Then, the controller 12 calculates the positions of the representative points $D_1$ to $D_{12}$ in the tool coordinate system $C_T$.

The position of each of the representative points $D_n$ can be expressed as coordinates in the tool coordinate system $C_T$ designated by the operator as illustrated in FIG. 5. The controller 12 can calculate coordinates of the respective representative points $D_n$ in the robot coordinate system $C_R$ by transforming the coordinates of the respective representative points $D_n$ in the tool coordinate system $C_T$ into the coordinates in the robot coordinate system $C_R$.

In this way, the controller 12 can calculate the positions of the respective representative points $D_n$ in the robot coordinate system $C_R$ when the robotic hand 28 grips the workpiece W in the real space. Thus, in this embodiment, the controller 12 functions as the representative point calculation section 58 configured to calculate the positions of the respective representative points $D_n$ on the basis of the workpiece position (more specifically, the origin-position of the tool coordinate system $C_T$).

At step S6, the controller 12 acquires a target position. The target position will be described with reference to FIG. 6. Note that, for the sake of easy understanding, FIG. 6 illustrates only the imaging section 16 and a section $C_n'$ of the workpiece W gripped by the robotic hand 28.

The section $C_n'$ in FIG. 6 is a virtual section on the workpiece W, which corresponds to the section $C_n$ (n=1 to 12) set in the workpiece model $W_M$. Further, the representative point $D_n'$ in FIG. 6 is a virtual point on the workpiece W, which corresponds to the representative point $D_n$ set in the workpiece model $W_M$.

The target position in this embodiment corresponds to a position and orientation of each component (the revolving drum 22, the robotic arm 24, the wrist 26, the robotic hand 28) of the movement mechanism 14 when the workpiece W and the imaging section 16 are positioned with respect to each other by the movement mechanism 14 as described below.

Specifically, when the movement mechanism 14 that grips the workpiece W is arranged at the target position, the optical axis O of the imaging section 16 passes the representative point $D_n'$ and is parallel to the y-axis of the tool coordinate system $C_T$, and the surface $S_I$ to be inspected is spaced apart from the imaging section 16 by the distance D in the y-axis negative direction of the tool coordinate system $C_T$.

For example, the position and orientation of each component of the movement mechanism 14 are defined by the rotation angle of each servomotor 38. Further, the controller 12 pre-stores the position of the optical axis O in the robot coordinate system $C_R$, as described above.

The controller 12 calculates the target position $E_n$ (i.e., the rotation angle of each servomotor 38) when the movement mechanism 14 positions the workpiece W and the imaging section 16 such that the optical axis O passes the representative point $D_n'$, based on the position of the representative point $D_n$ in the robot coordinate system $C_R$ calculated at step S5 and on the pre-stored position of the optical axis O in the robot coordinate system $C_R$.

In this embodiment, since the total of 12 representative points $D_1$ to $D_{12}$ are set, the controller 12 acquires the target positions $E_1$ to $E_{12}$ for respective representative points $D_1$ to $D_{12}$. The controller 12 stores the acquired target positions $E_1$ to $E_{12}$ in the storage.

Thus, in this embodiment, the controller 12 functions as the target position acquisition section 60 configured to acquire the target positions $E_1$ to $E_{12}$.

Note that, at this step S6, the target positions $E_1$ to $E_{12}$ may be acquired with using the real movement mechanism 14, or may be acquired by calculating the target positions $E_1$ to $E_{12}$ in a virtual space with using e.g. simulation software.

At step S7, the controller 12 generates an operation program based on the target positions $E_n$ (n=1 to 12) acquired at step S6. As an example, the controller 12 generates an operation program that causes the controller 12 to execute a sequence illustrated in FIG. 7.

Figure 7:
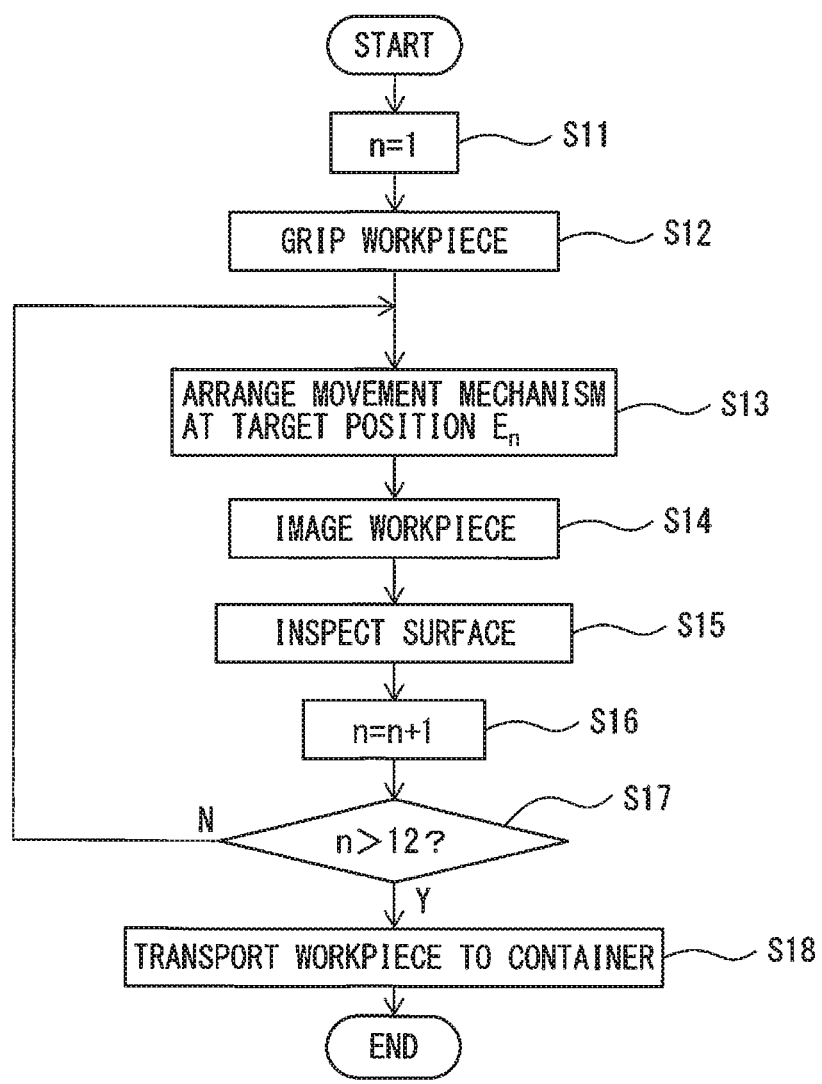
FIG. 7 is a flowchart illustrating an example of an operation program generated by the operation program generation device illustrated in FIG. 2.

Referring to FIG. 7, an example of the operation program will be described. The sequence illustrated in FIG. 7 is started when the controller 12 receives from the operator or host controller an inspection command for inspecting the surface $S_I$ to be inspected of the workpiece W. At this time, the controller 12 turns the lighting device 18 ON.

At step S11, the controller 12 sets the number "n" of the target position $E_n$ to "1." At step S12, the controller 12 operates the movement mechanism 14 so as to grip the workpiece W stored in the predetermined storage location by the robotic hand 28. At this time, the robotic hand 28 grips the workpiece W at the workpiece position corresponding to the tool coordinate system $C_T$ designated by the operator.

At step S13, the controller 12 arranges the movement mechanism 14 at the target position $E_n$. For example, when the number "n" of the target position $E_n$ is set to "1" at the start of step S13, the controller 12 arranges the movement mechanism 14 at the target position $E_1$.

Due to this, the workpiece W gripped by the robotic hand 28 is positioned with respect to the imaging section 16 such that the optical axis O of the imaging section 16 passes the representative point $D_1'$ and the surface $S_I$ is spaced apart from the imaging section 16 by the distance D in the y-axis negative direction of the tool coordinate system $C_T$. In addition, since the optical axis O is parallel to the y-axis of the tool coordinate system $C_T$ as described above, the optical axis O is orthogonal to the surface $S_I$.

At step S14, the controller 12 operates the imaging section 16 so as to image the workpiece W. More specifically, the controller 12 transmits an imaging command to the imaging section 16. When receiving the imaging command from the controller 12, the imaging section 16 images the surface $S_I$ of the workpiece W.

If the movement mechanism 14 is arranged at the target position $E_1$ at step S13, the imaging section 16 images the section $C_1'$ of the workpiece W. At this time, the imaging section 16 and the workpiece W are positioned with respect to each other such that the optical axis O passes the representative point $D_1'$ which is the center point of the section $C_1'$.

In addition, since the surface model $S_{IM}$ is divided at the above-mentioned step S3 such that the size of the section $C_1$ is not larger than the FOV size B, the size of the section $C_1'$ of the workpiece W is also not larger than the FOV size B. Therefore, the imaging section 16 can reliably image the entire area of the section $C_1'$ of the workpiece W. The imaging section 16 transmits the captured image to the controller 12.

At step S15, the controller 12 analyzes the image obtained from the imaging section 16 at step S14 so as to detect a defect such as a scratch formed on the surface $S_I$ to be inspected. If the section $C_1'$ of the surface $S_I$ is imaged at step S14, the controller 12 detects a defect in the section $C_1'$.

At step S16, the controller 12 increments the number "n" of the target position $E_n$ by "1" (i.e., n=n+1).

At step S17, the controller 12 determines whether the number "n" of the target position $E_n$ is an integer greater than "12." When the controller 12 determines that the number "n" is an integer greater than "12" (i.e., determines YES), it proceeds to step S18. On the other hand, when the controller 12 determines that the number "n" is an integer not greater than "12" (i.e., determines NO), it returns to step S13.

At step S18, the controller 12 operates the movement mechanism 14 so as to transport the workpiece W gripped by the movement mechanism 14 to a predetermined container, and put the workpiece W in the container.

The controller 12 generates the operation program as illustrated in FIG. 7 on the basis of the target position $E_n$ acquired at step S6, and controls the operations of moving the workpiece W by the movement mechanism 14 and imaging the surface $S_I$ to be inspected by the imaging section 16, by executing the operation program.

Thus, in this embodiment, the controller 12 functions as the program generation section 62 configured to generate the operation program based on the target position $E_n$.

As described above, the operation program generation device 50 according to this embodiment can construct from the drawing data of the workpiece W the operation program for the inspection system 10 to inspect the surface $S_I$ to be inspected.

According to this configuration, man-hour of the operator for teaching the movement mechanism 14 in order to generate the operation program can be reduced, and thus, it is possible to construct the inspection system 10 easily and quickly.

Further, in this embodiment, the controller 12 divides the surface $S_I$ to be inspected (the surface model $S_{IM}$) into a plurality of sections $C_1'$ to $C_{12}'$ (sections $C_1$ to $C_{12}$) (step S3).

According to this configuration, even when the FOV size B is small by setting the resolution of the imaging section 16 higher, the entire area of the surface $S_I$ can be reliably inspected by repeatedly carry out the above-mentioned steps 13 to 17. Therefore, since the surface $S_I$ to be inspected can be imaged by the imaging section 16 with higher resolution, it is possible to inspect the surface $S_I$ in greater detail.

Further, in this embodiment, the controller 12 receives the workpiece position designated by the operator and calculates the positions of the representative points $D_1$ to $D_{12}$ on the basis of the workpiece position (step S5). According to this configuration, it is possible to calculate the positions of the representative points $D_1$ to $D_{12}$ more easily and more accurately.

Note that, the controller 12 may further acquire an inclined target position (second target position) $F_{n\_m}$ when the controller 12 acquires the target position $E_n$ at the aforementioned step S6. The inclined target position $F_{n\_m}$ will be described with reference to FIG. 8 to FIG. 11.

Figure 8:
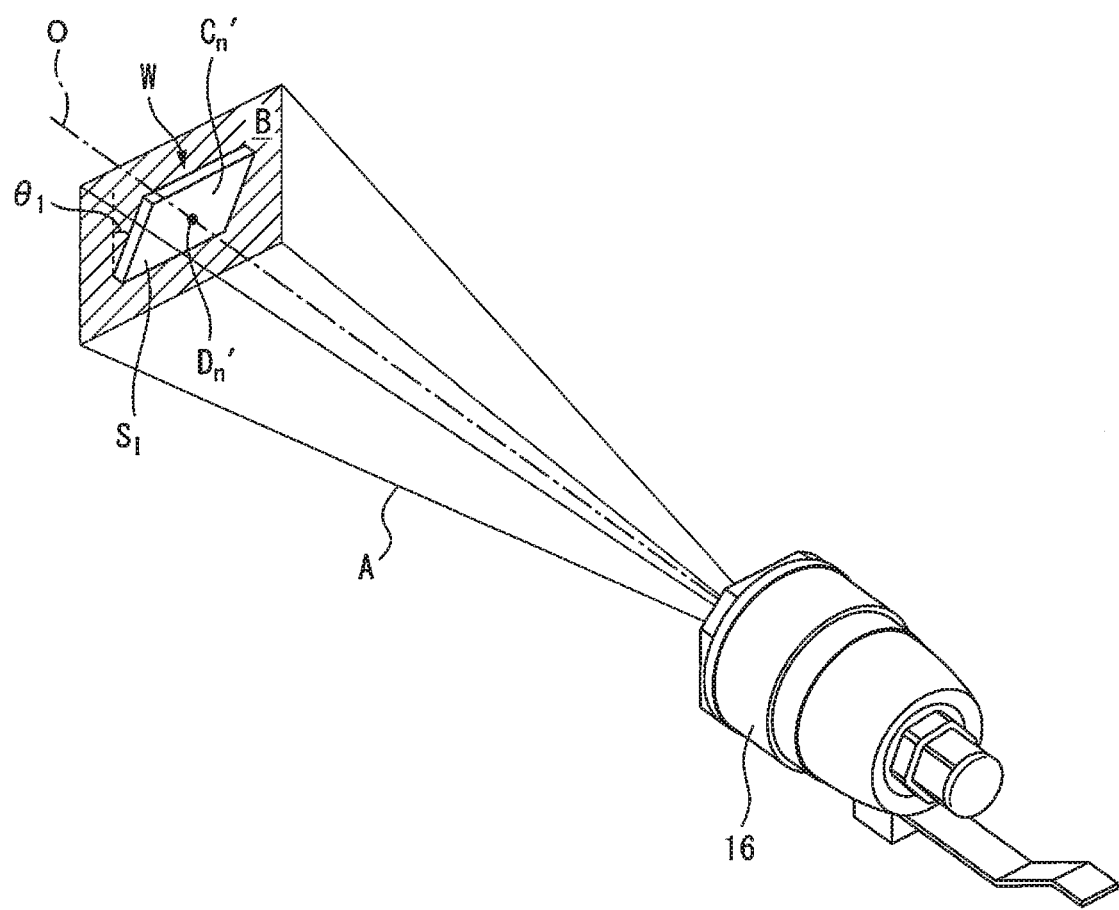
FIG. 8 is a diagram for describing step S20 in FIG. 13.

FIG. 8 to FIG. 11 are diagrams corresponding to FIG. 6, and illustrate only the imaging section 16 and the section $C_n'$ of the workpiece W gripped by the robotic hand 28, for the sake of easy understanding. FIG. 8 illustrates a positional relationship between the imaging section 16 and the section $C_n'$ when the movement mechanism 14 that grips the workpiece W is arranged at a first inclined target position $F_{n\_1}$.

The workpiece W gripped by the movement mechanism 14 when the movement mechanism 14 is arranged at the first inclined target position $F_{n\_1}$ is arranged at a position obtained by rotating the workpiece W illustrated in FIG. 6 by an angle $\theta_1$ (FIG. 8) in a direction H about a virtual axis G in FIG. 6.

The virtual axis G passes the representative point $D_n'$ and is parallel to the x-axis of the tool coordinate system in FIG. 1. In this manner, when the movement mechanism 14 is arranged at the first inclined target position $F_{n\_1}$, the movement mechanism 14 moves the workpiece W so as to change an angle of the surface $S_I$ with respect to the optical axis O of the imaging section 16.

The first inclined target position $F_{n\_1}$ corresponds to a position and orientation of each component (the revolving drum 22, the robotic arm 24, the wrist 26, and the robotic hand 28) of the movement mechanism 14 when the workpiece W and the imaging section 16 are positioned by the movement mechanism 14 as illustrated in FIG. 8.

The controller 12 calculates the first inclined target position $F_{n\_1}$ (i.e., the rotation angle of each servomotor 38) on the basis of the position of the optical axis O in the robot coordinate system $C_R$, the calculated position of the representative point $D_n$, and the angle $\theta_1$. The angle $\theta_1$ is predetermined by the operator and stored in the storage of the controller 12.

Figure 9:
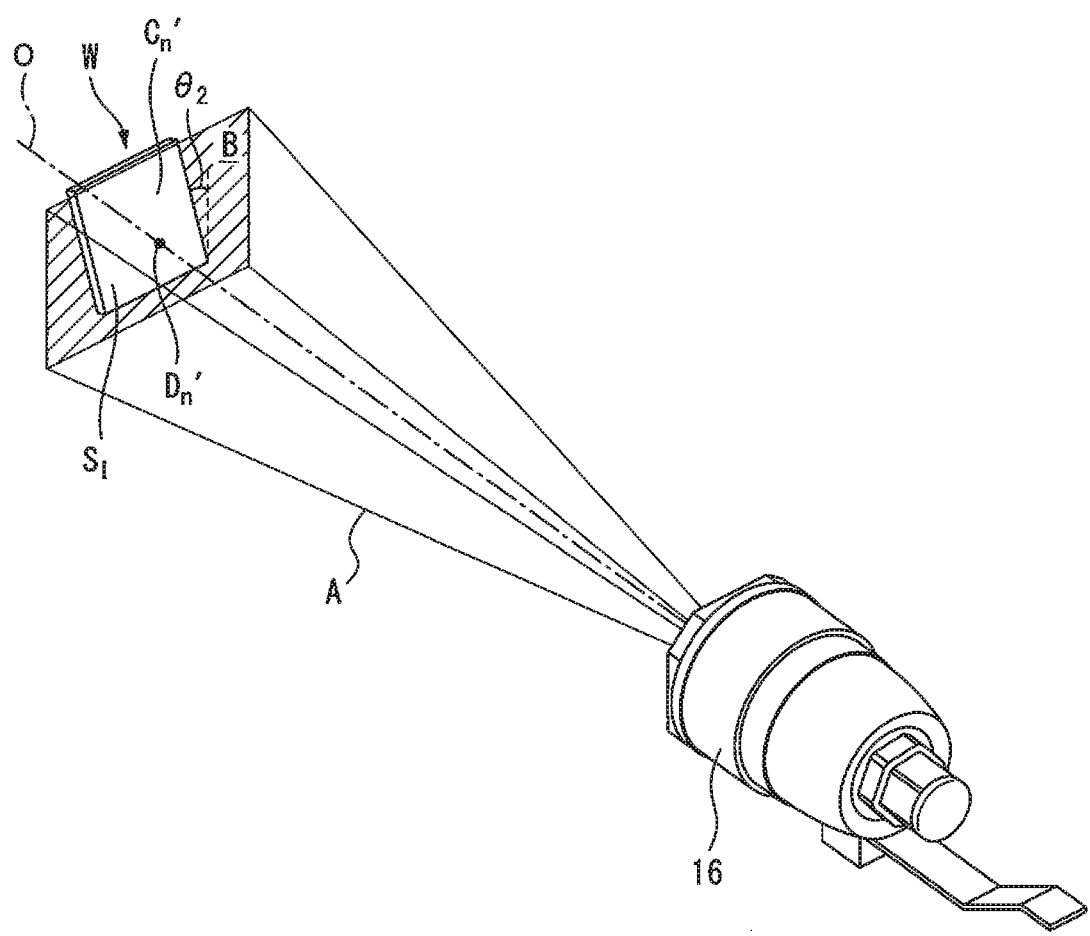
FIG. 9 is a diagram for describing step S20 in FIG. 13.

FIG. 9 shows that the movement mechanism 14 that grips the workpiece W is arranged at a second inclined target position $F_{n\_2}$. When the movement mechanism 14 is arranged at the second inclined target position $F_{n\_2}$, the workpiece W gripped by the movement mechanism 14 is arranged at a position obtained by rotating the workpiece W illustrated in FIG. 6 by an angle $\theta_2$ (FIG. 9) in a direction opposite to the direction H about the virtual axis G in FIG. 6.

The second inclined target position $F_{n\_2}$ corresponds to a position and orientation of each component of the movement mechanism 14 when the workpiece W and the imaging section 16 are positioned by the movement mechanism 14 as illustrated in FIG. 9.

The controller 12 calculates the second inclined target position $F_{n\_2}$ (i.e., the rotation angle of each servomotor 38) on the basis of the position of the optical axis O in the robot coordinate system $C_R$, the calculated position of the representative point $D_n$, and the angle $\theta_2$. The angle $\theta_2$ is predetermined by the operator and stored in the storage of the controller 12.

Figure 10:
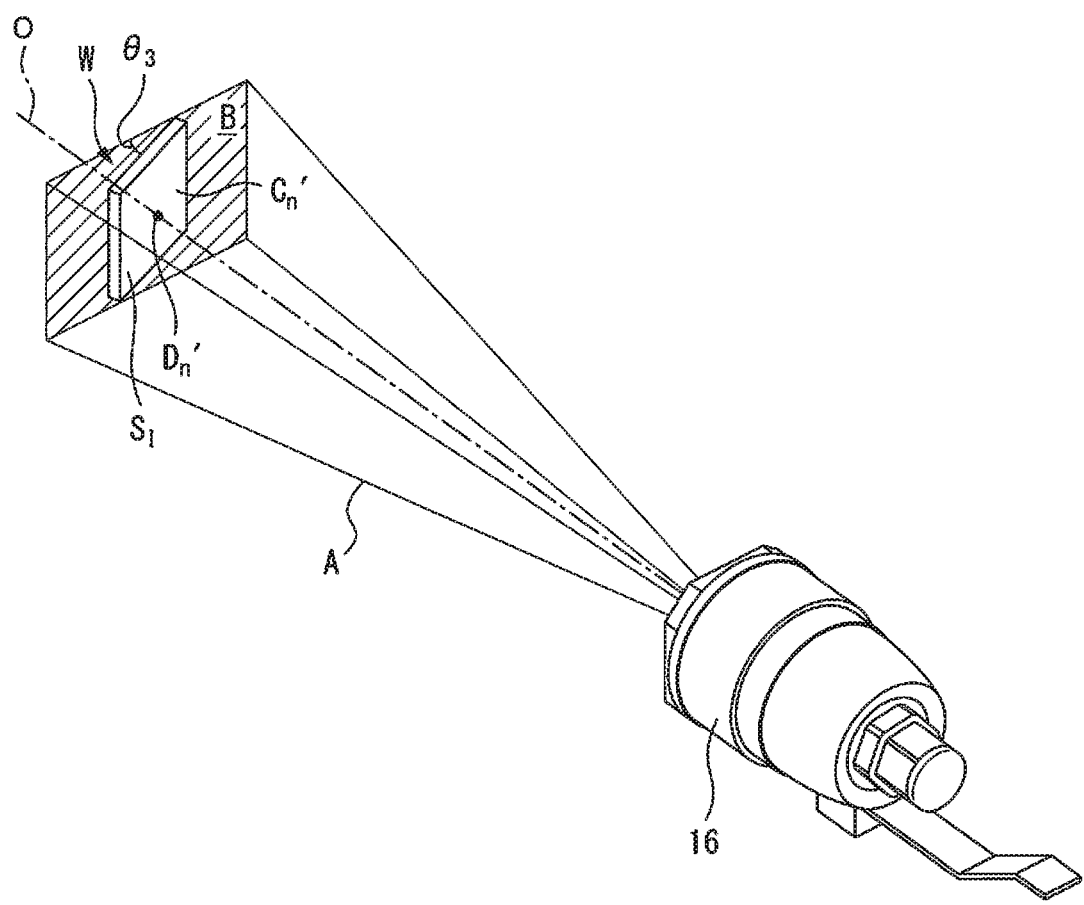
FIG. 10 is a diagram for describing step S20 in FIG. 13.

FIG. 10 shows that the movement mechanism 14 that grips the workpiece W is arranged at a third inclined target position $F_{n\_3}$. When the movement mechanism 14 is arranged at the third inclined target position $F_{n\_3}$, the workpiece W gripped by the movement mechanism 14 is arranged at a position obtained by rotating the workpiece W illustrated in FIG. 6 by an angle $\theta_3$ (FIG. 10) in a direction J about a virtual axis I in FIG. 6. The virtual axis I passes the representative point $D_n'$ and is parallel to the z-axis of the tool coordinate system in FIG. 1.

The third inclined target position $F_{n\_3}$ corresponds to a position and orientation of each component of the movement mechanism 14 when the workpiece W and the imaging section 16 are positioned by the movement mechanism 14 as illustrated in FIG. 10.

The controller 12 calculates the third inclined target position $F_{n\_3}$ (i.e., the rotation angle of each servomotor 38)

on the basis of the position of the optical axis O in the robot coordinate system $C_R$, the calculated position of the representative point $D_n$, and the angle $\theta_3$. The angle $\theta_3$ is predetermined by the operator and stored in the storage of the controller 12.

Figure 11:
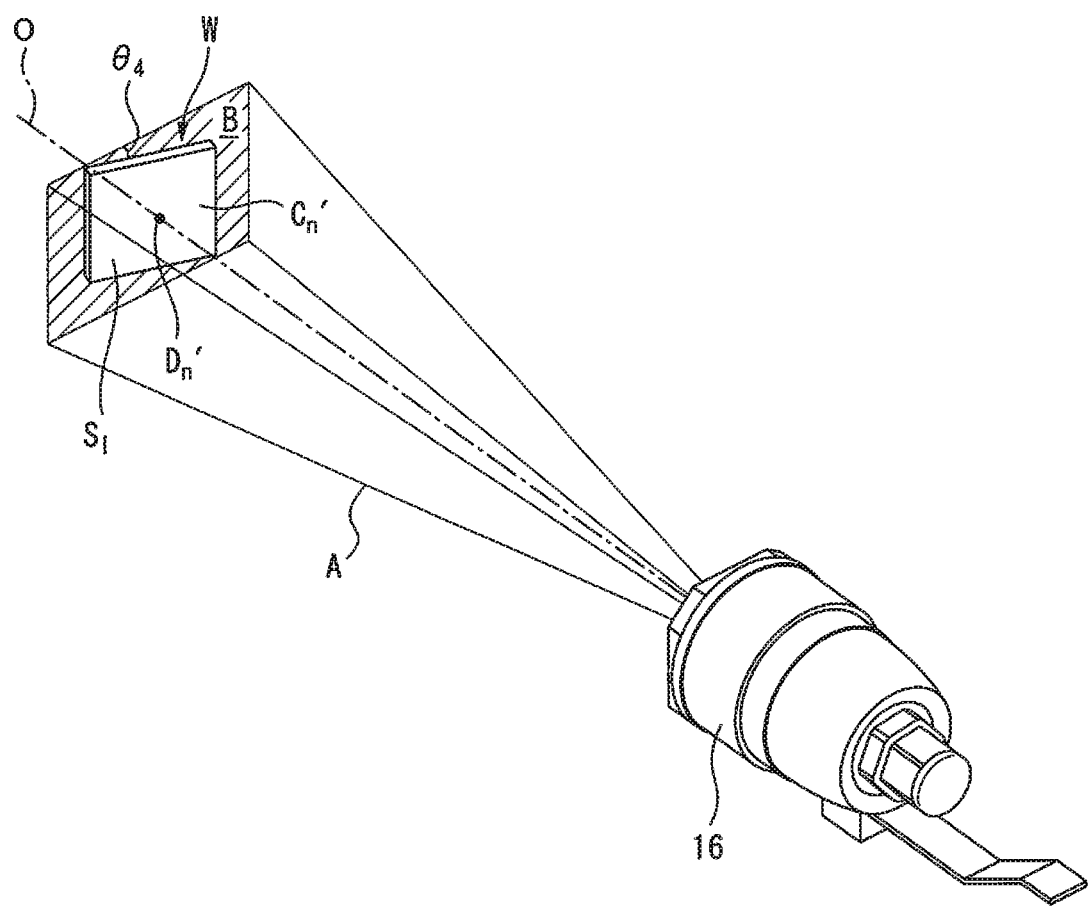
FIG. 11 is a diagram for describing step S20 in FIG. 13.

FIG. 11 shows that the movement mechanism 14 that grips the workpiece W is arranged at a fourth inclined target position $F_{n\_4}$. When the movement mechanism 14 is arranged at the fourth inclined target position $F_{n\_4}$, the workpiece W gripped by the movement mechanism 14 is arranged at a position obtained by rotating the workpiece W illustrated in FIG. 6 by an angle $\theta_4$ (FIG. 11) in a direction opposite to the direction J about the virtual axis I in FIG. 6.

The fourth inclined target position $F_{n\_4}$ corresponds to a position and orientation of each component of the movement mechanism 14 when the workpiece W and the imaging section 16 are positioned by the movement mechanism 14 as illustrated in FIG. 11.

The controller 12 calculates the fourth inclined target position $F_{n\_4}$ (i.e., the rotation angle of each servomotor 38) on the basis of the position of the optical axis O in the robot coordinate system $C_R$, the calculated position of the representative point $D_n$, and the angle $\theta_4$. The angle $\theta_4$ is predetermined by the operator and stored in the storage of the controller 12.

In this manner, the controller 12 further calculates a total of four inclined target positions $F_{n\_m}$ (m=1 to 4) every time the controller 12 calculates the target positions $E_n$ (n=1 to 12) at step S6, and stores them in the storage.

At this step S6, the inclined target positions $F_{n\_m}$ may be acquired with using the real movement mechanism 14, or may be acquired by calculating the inclined target positions $F_{n\_m}$ in the virtual space with using simulation software or the like.

Then, at step S7, the controller 12 generates an operation program on the basis of the target positions $E_n$ and the inclined target positions $F_{n\_m}$ acquired at step S6. As an example, the controller 12 generates an operation program that causes the controller 12 to execute a sequence illustrated in FIG. 12 and FIG. 13.

Figure 12:
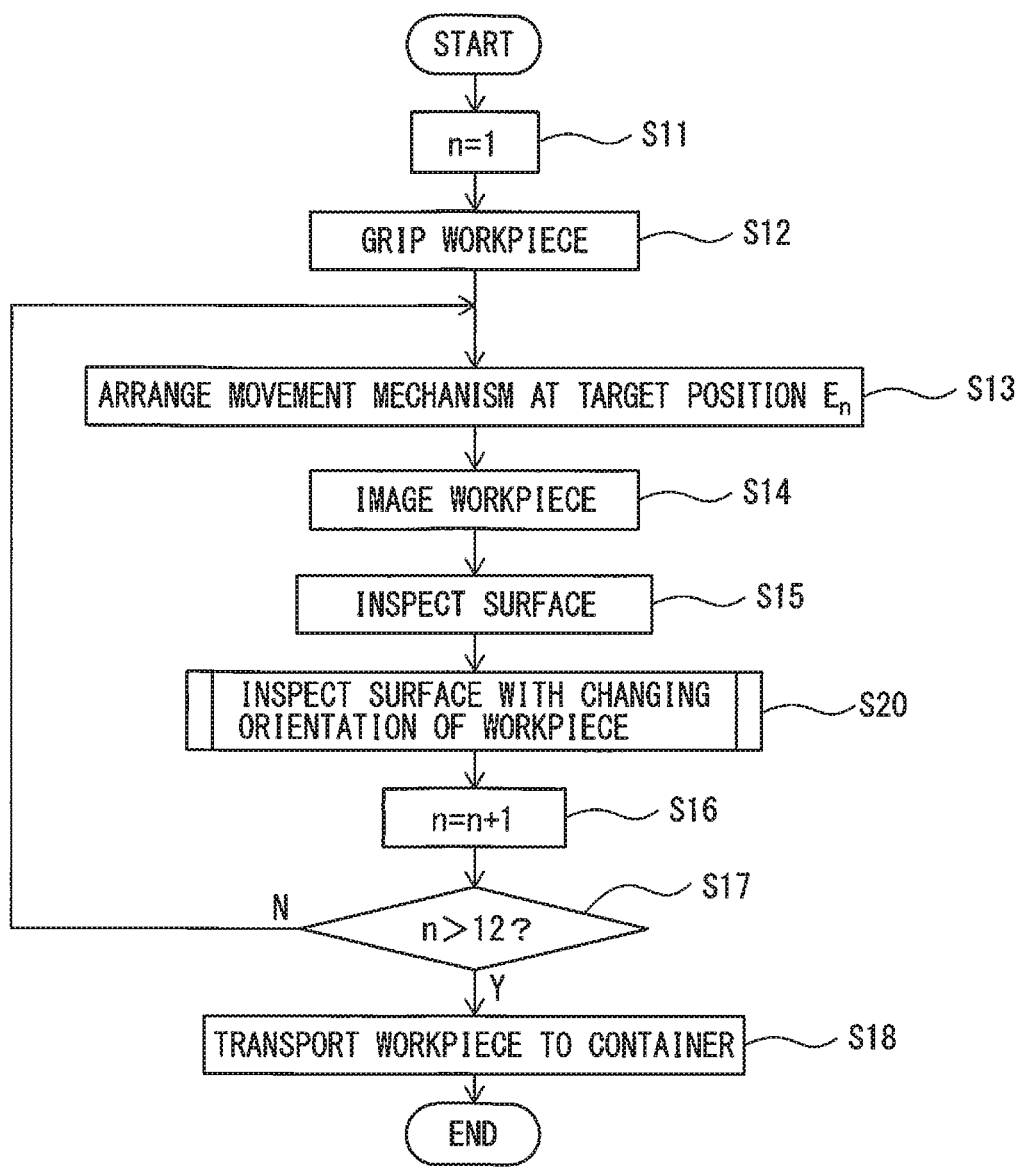
FIG. 12 is a flowchart illustrating another example of the operation program generated by the operation program generation device illustrated in FIG. 2.
Figure 13:
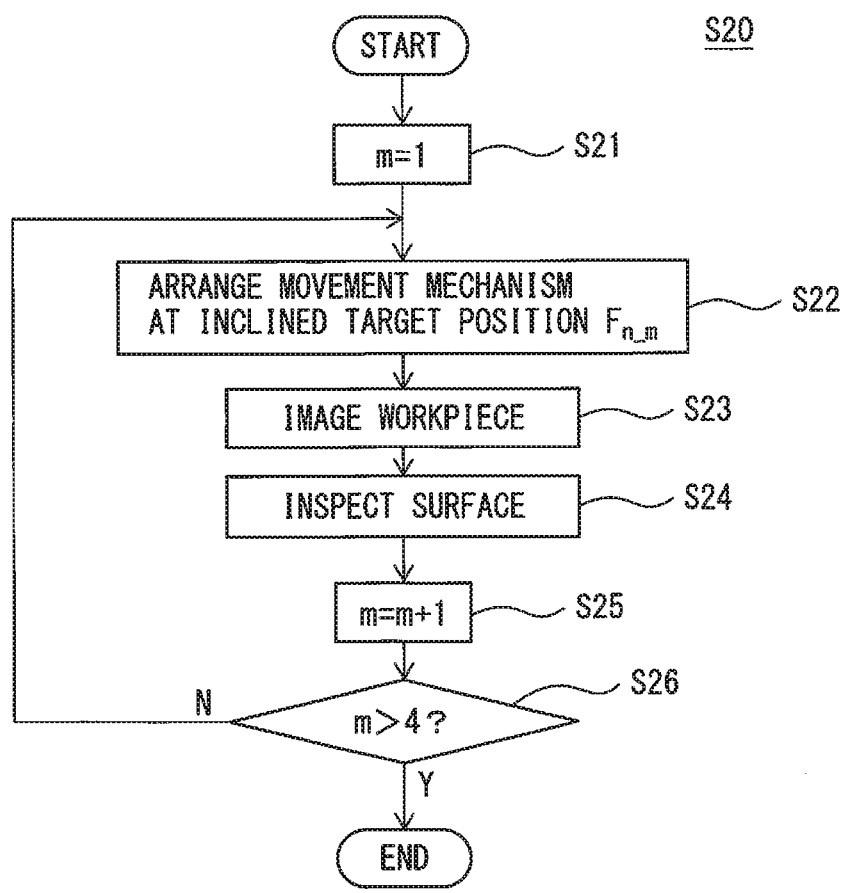
FIG. 13 is a flowchart illustrating an example of step S20 in FIG. 12.

Referring to FIG. 12 and FIG. 13, an example of the operation program generated in this embodiment will be described. The sequence illustrated in FIG. 12 differs from that in FIG. 7 in step S20.

Specifically, after step S15, the controller 12 carries out an inspection process with changing the orientation of the workpiece W at step S20. An example of this process is illustrated in FIG. 13. When the sequence illustrated in FIG. 13 is started, the controller 12 sets the number "m" of the inclined target position $F_{n\_m}$ to "1" at step S21.

At step S22, the controller 12 arranges the movement mechanism 14 at the inclined target position $F_{n\_m}$. For example, when the number "m" of the inclined target position $F_{n\_m}$ is set to "1" at the start of step S22, the controller 12 arranges the movement mechanism 14 at the first inclined target position $F_{n\_1}$ illustrated in FIG. 8.

At step S23, similarly to the aforementioned step S14, the controller 12 operates the imaging section 16 so as to image the workpiece W. If n=1 and m=1 are set at the start of step S22, the imaging section 16 images the section $C_1'$ of the workpiece W in a state in which the section $C_1'$ is inclined as illustrated in FIG. 8.

At this time, the imaging section 16 and the workpiece W are positioned with respect to each other such that the optical axis O passes the representative point $D_1'$, which is the center point of the section $C_1'$. The imaging section 16 transmits the captured image to the controller 12.

At step S24, the controller 12 analyzes the image obtained from the imaging section 16 at step S23 so as to detect a defect such as a scratch formed on the surface $S_I$ to be inspected. If the section $C_1'$ of the surface $S_I$ is imaged at step S23, the controller 12 detects a defect in the section $C_1'$ At step S25, the controller 12 increments the number "m" of the inclined target position $F_{n\_m}$ by "1" (i.e., m=m+1).

At step S26, the controller 12 determines whether the number "m" of the inclined target position $F_{n\_m}$ is an integer greater than "4." When the controller 12 determines that the number "m" is an integer greater than "4" (i.e., determines YES), the controller 12 ends the sequence illustrated in FIG. 13. On the other hand, when the controller 12 determines that the number "m" is an integer not greater than "4" (i.e., determines NO), it returns to step S22.

Thus, according to the operation program according to this embodiment, the controller 12 arranges the movement mechanism 14 at each of the total of four inclined target positions $F_{n\_m}$ for each of the total of 12 target positions $E_n$, and images the workpiece W by the imaging section 16. According to this configuration, since the workpiece W can be imaged from various angles, it is possible to detect a defect such as a scratch formed on the surface $S_I$ with higher accuracy.

Note that, in this embodiment, the number of the inclined target positions $F_{n\_m}$ is four (i.e., m=1 to 4). However, the number of the inclined target positions $F_{n\_m}$ is not limited to four and any number of the inclined target positions $F_{n\_m}$ may be set.

Figure 14:
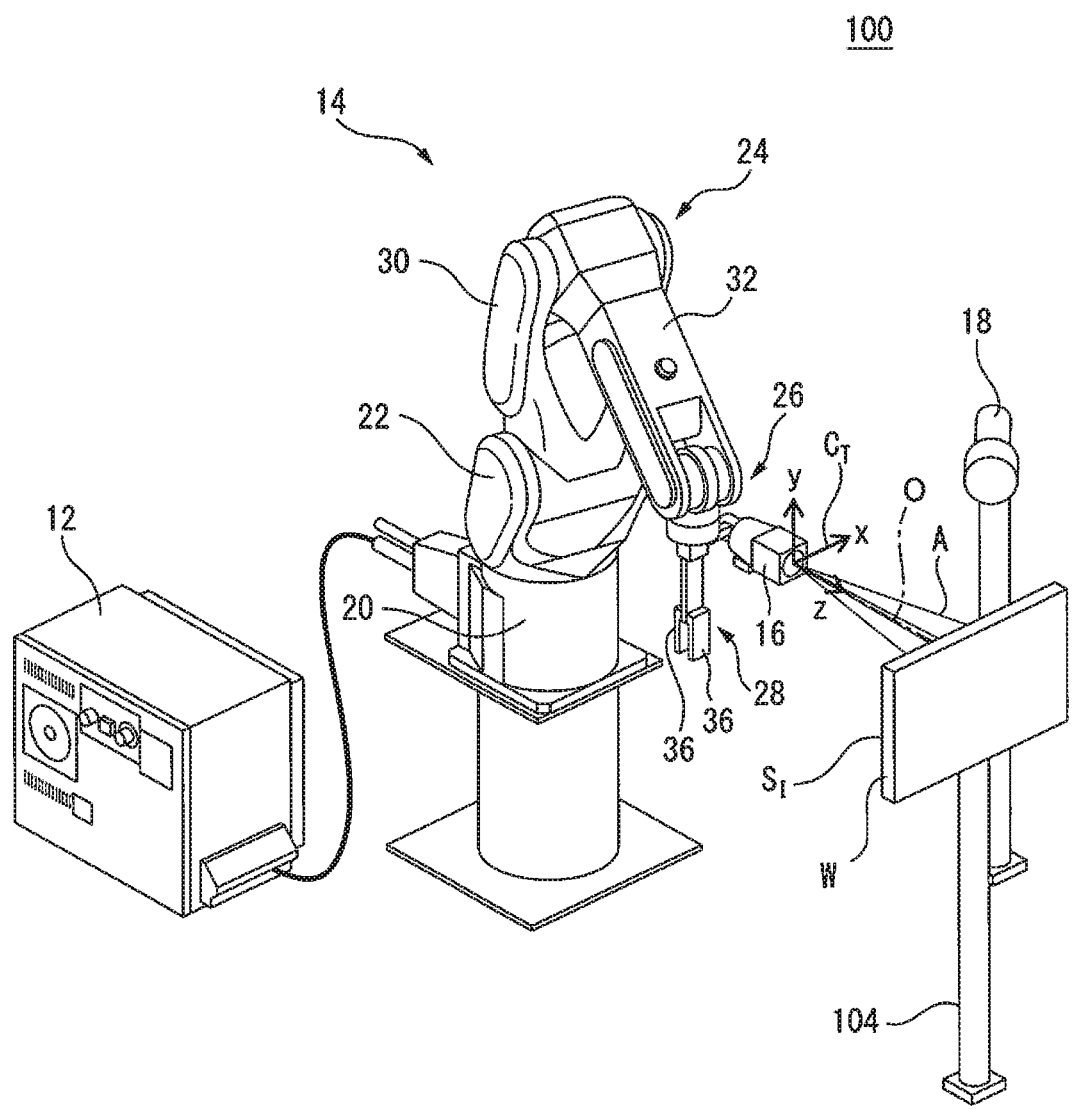
FIG. 14 is a diagram illustrating an inspection system according to another embodiment.

Next, referring to FIG. 2 and FIG. 14, an inspection system 100 according to another embodiment is described. The inspection system 100 differs from the aforementioned inspection system 10 in the following configuration.

In the inspection system 100, the imaging section 16 is fixed to the wrist 26 of the movement mechanism 14. On the other hand, the workpiece W is fixed to a workpiece holder 104. The storage of the controller 12 pre-stores information of the fixed position of the workpiece W in the robot coordinate system $C_R$.

In this embodiment, the tool coordinate system $C_T$ is set to the imaging section 16. The tool coordinate system $C_T$ is one of the coordinate systems for automatic control, and a position and orientation of the imaging section 16 in a space are defined by expressing the position and orientation of the tool coordinate system $C_T$ in the robot coordinate system $C_R$. In this embodiment, the tool coordinate system $C_T$ is set such that the z-axis of the tool coordinate system $C_T$ coincides with the optical axis O of the imaging section 16.

The controller 12 operates the revolving drum 22, the robotic arm 24, and the wrist 26 in the robot coordinate system $C_R$ such that the position and orientation of the imaging section 16 coincides with the position and orientation defined by the tool coordinate system $C_T$. Thus, the imaging section 16 is arranged at an arbitrary position and orientation in the robot coordinate system $C_R$.

The storage of the controller 12 pre-stores an operation program that causes the controller 12 to carry out an operation of inspecting workpiece surface. The operation program generation device 50 according to this embodiment generates such operation program automatically.

Referring to FIG. 4 to FIG. 6, an operation sequence of the operation program generation device 50 according to this embodiment will be described below. The sequence illustrated in FIG. 4 is started when the controller 12 receives an operation program generation command from an operator.

At step S1, similarly to the aforementioned embodiment, the controller 12 serves as the drawing acquisition section 52 and acquires drawing data of the workpiece W.

At step S2, similarly to the aforementioned embodiment, the controller 12 serves as the designation receiving section 54 and receives designation of a surface to be inspected in the drawing data of the workpiece W.

At step S3, similarly to the aforementioned embodiment, the controller 12 serves as the segmentation section 55 and divides the surface to be inspected designated at step S2 into a plurality of sections. For example, the controller 12 divides the surface model $S_{IM}$ designated at step S2 as illustrated in Section (b) in FIG. 5.

At step S4, similarly to the aforementioned embodiment, the controller 12 serves as the representative point setting section 56, and sets representative points in the surface to be inspected. For example, the controller 12 sets one representative point $D_n$ in each of the sections $C_n$ (n=1 to 12) divided at step S3, as illustrated in Section (b) in FIG. 5.

At step S5, the controller 12 serves as the representative point calculation section 58 and calculates positions of the representative points $D_n$ set at step S4. Here, as described above, information of the fixed position of the workpiece W in the robot coordinate system $C_R$ is pre-stored in the storage of the controller 12 in this embodiment.

The controller 12 calculates coordinates of each representative point $D_n$ in the robot coordinate system $C_R$ on the basis of the information of the fixed position of the workpiece W in the robot coordinate system $C_R$ and the drawing data of the workpiece W (i.e., the workpiece model $W_M$). In this manner, in this embodiment, the controller 12 calculates the positions of the representative points $D_1$ to $D_{12}$ on the basis of the position at which the workpiece W is fixed.

At step S6, the controller 12 serves as the target position acquisition section 60 and acquires target positions. The target position in this embodiment corresponds to the position and orientation of each component (the revolving drum 22, the robotic arm 24, the wrist 26, the robotic hand 28) of the movement mechanism 14 when the imaging section 16 fixed to the wrist 26 of the movement mechanism 14 is positioned with respect to the workpiece W as illustrated in FIG. 6.

When the movement mechanism 14 is arranged at the target position, the optical axis O of the imaging section 16 (i.e., the z-axis of the tool coordinate system $C_T$) passes the representative point $D_n'$ and the surface $S_I$ is spaced apart from the imaging section 16 by the distance D in the z-axis plus direction of the tool coordinate system $C_T$.

The controller 12 calculates the target position Ln (i.e., the rotation angle of each servomotor 38) when the movement mechanism 14 positions the imaging section 16 with respect to the workpiece W as illustrated in FIG. 6.

In this embodiment, since a total of 12 representative points $D_1$ to $D_{12}$ are set, the controller 12 acquires the target positions $L_1$ to $L_{12}$ for the respective representative points $D_1$ to $D_{12}$. The controller 12 stores the acquired target position $L_1$ to $L_{12}$ in the storage.

At step S6, the target positions $L_1$ to $L_{12}$ may be acquired with using the real movement mechanism 14, or may be acquired by calculating the target positions $L_1$ to $L_{12}$ in the virtual space with using simulation software or the like.

At step S7, the controller 12 serves as the program generation section 62 and generates an operation program on the basis of the target positions $L_1$ to $L_{12}$ acquired at step S6. As an example, the controller 12 generates an operation program that causes the controller 12 to execute a sequence illustrated in FIG. 15.

Figure 15:
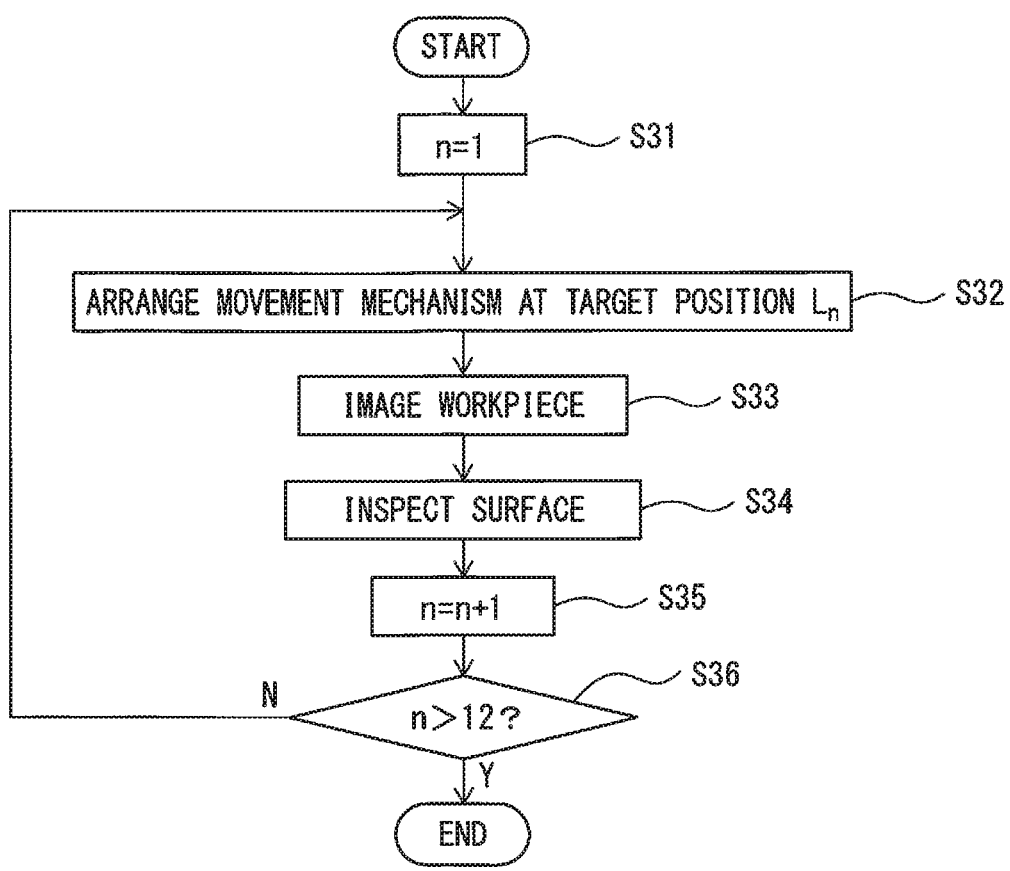
FIG. 15 is a flowchart illustrating an example of an operation sequence generated by the operation program generation device illustrated in FIG. 14.

Referring to FIG. 15, an example of the operation program will be described. The sequence illustrated in FIG. 15 is started when the operator mounts the workpiece W on the workpiece holder 104 and the controller 12 receives an inspection command from the operator or host controller. At this time, the controller 12 turns the lighting device 18 ON.

At step S31, the controller 12 sets the number "n" of the target position $L_n$ to "1." At step S32, the controller 12 arranges the movement mechanism 14 at the target position $L_n$. For example, when the number "n" of the target position $L_n$ is set to "1" at the start of this step S32, the controller 12 arranges the movement mechanism 14 at the target position $L_1$.

By this operation, the imaging section 16 is positioned with respect to the workpiece W such that the optical axis O of the imaging section 16 fixed to the wrist 26 of the movement mechanism 14 passes the representative point $D_1'$ and the surface $S_I$ is spaced apart from the imaging section 16 by the distance D in the z-axis plus direction of the tool coordinate system $C_T$.

At step S33, similarly to the aforementioned step S14, the controller 12 operates the imaging section 16 so as to image the workpiece W. If the movement mechanism 14 is arranged at the target position $L_1$ at step S32, the imaging section 16 images the section $C_1'$ of the workpiece W. The imaging section 16 transmits the captured image to the controller 12.

At step S34, the controller 12 analyzes the image obtained from the imaging section 16 at step S33 so as to detect a defect such as a scratch formed on the surface $S_I$ to be inspected. If the section $C_1'$ of the surface $S_I$ is imaged at step S33, the controller 12 detects a defect in the section $C_1'$.

At step S35, the controller 12 increments the number "n" of the target position $L_n$ by "1" (i.e., n=n+1).

At step S36, the controller 12 determines whether the number "n" of the target position Ln is an integer greater than "12." When the controller 12 determines that the number "n" is an integer greater than "12" (i.e., determines YES), the controller 12 ends the sequence illustrated in FIG. 15. On the other hand, when the controller 12 determines that the number "n" is an integer not greater than "12" (i.e., determines NO), it returns to step S32.

By executing the operation program illustrated in FIG. 15, the controller 12 controls the operation of moving the imaging section 16 with the movement mechanism 14 and imaging the surface $S_I$ with the imaging section 16. The controller 12 generates the operation program as illustrated in FIG. 15 on the basis of the target positions $L_1$ to $L_{12}$ acquired at step S6.

As described above, the operation program generation device 50 according to this embodiment can construct the operation program for the inspection system 100 to inspect the surface $S_I$ to be inspected, from the drawing data of the workpiece W.

According to this configuration, man-hour of the operator for teaching the movement mechanism 14 in order to generate the operation program can be reduced, thereby it is possible to construct the inspection system 100 easily and quickly.

In the aforementioned embodiments, the controller 12 divides the surface $S_I$ (specifically, the surface model $S_{IM}$) into the plurality of sections at step S3. However, step S3 may be omitted if the size of the workpiece W is small or the FOV size B can be set to be large, for example.

Figure 16:
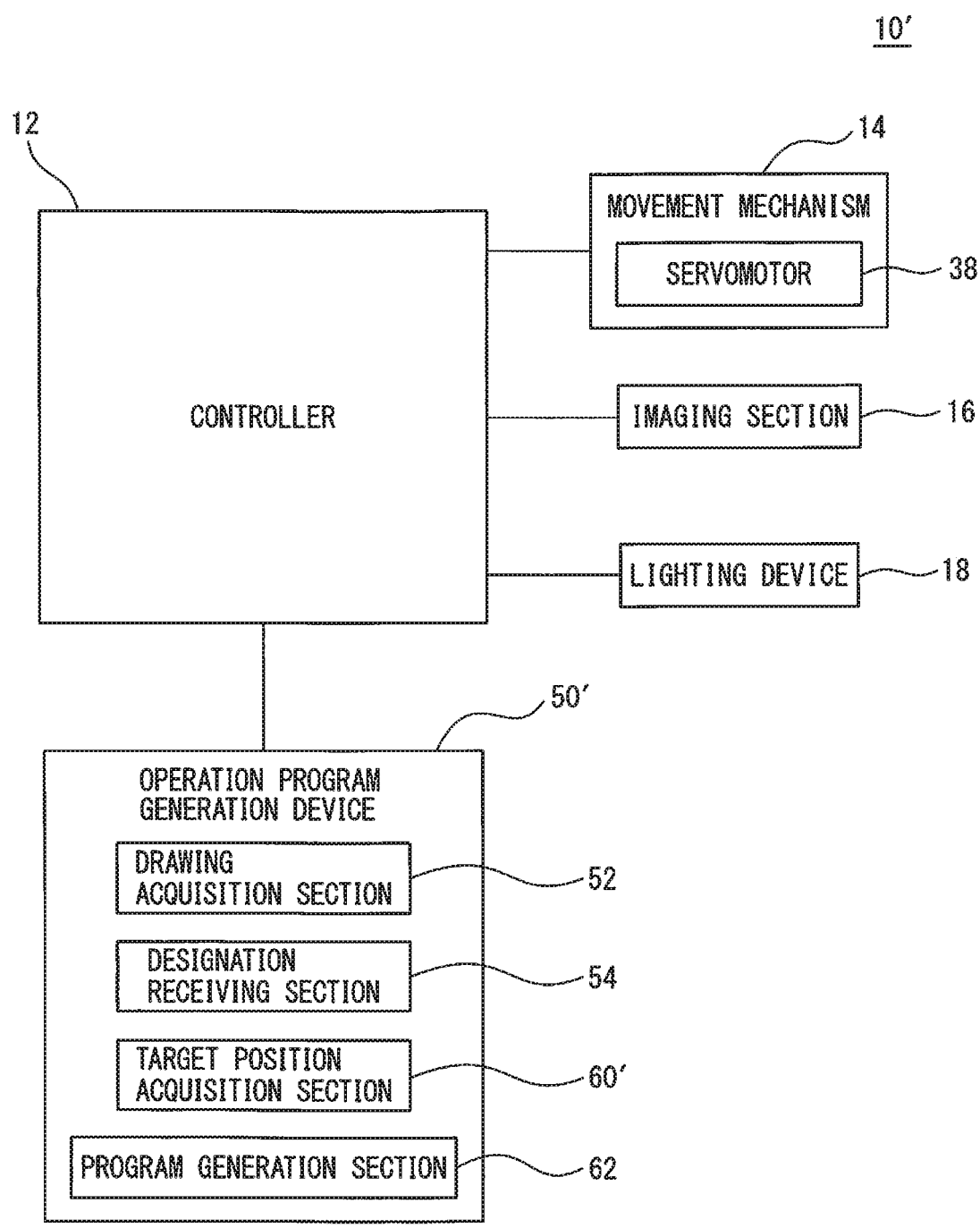
FIG. 16 is a diagram illustrating an inspection system according to still another embodiment.

Next, referring to FIG. 16, an inspection system 10' according to still another embodiment is described. The inspection system 10' includes the controller 12, the movement mechanism 14, the imaging section 16, the lighting device 18, and an operation program generation device 50'.

The operation program generation device 50' differs from the above-mentioned operation program generation device 50 in the following configuration. Specifically, the operation program generation device 50' includes the drawing acquisition section 52, the designation receiving section 54, a target position acquisition section 60', and the program generation section 62, while the operation program generation device 50' does not include the representative point setting section 56 and the representative point calculation section 58.

In addition, the operation program generation device 50' is configured as a separate component from the controller 12. The operation program generation device 50' may be comprised of a single computer including e.g. a CPU and storage.

Alternatively, each of the drawing acquisition section 52, the designation receiving section 54, the target position acquisition section 60', and the program generation section 62 of the operation program generation device 50' may be comprised of a single computer including e.g. a CPU and storage.

Figure 17:
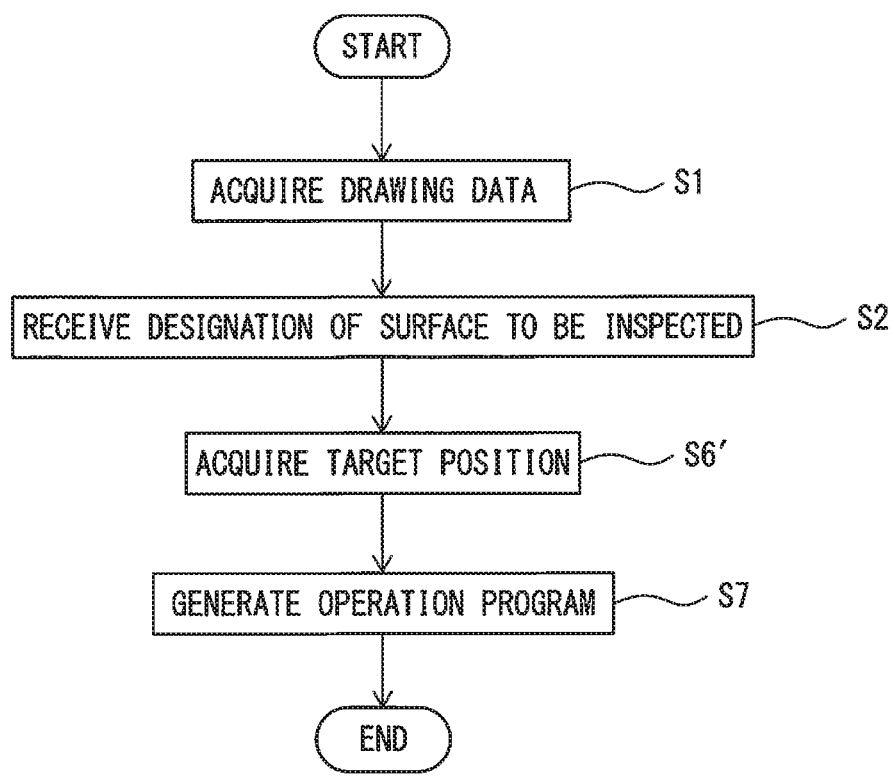
FIG. 17 is a flowchart illustrating an example of an operation sequence generated by an operation program generation device illustrated in FIG. 16.

Next, referring to FIG. 17, an example of an operation sequence of the operation program generation device 50' will be described. In FIG. 17, processes similar to those in FIG. 4 are assigned the same step numbers, and the detailed descriptions thereof will be omitted.

Figure 18:
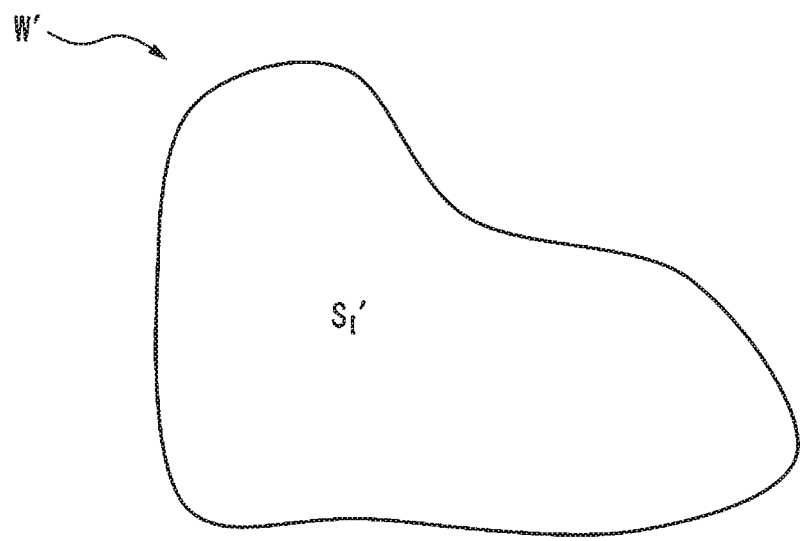
FIG. 18 illustrates an example of drawing data of a workpiece according to the still another embodiment.

Below, a case is described where the drawing data of a workpiece W' illustrated in FIG. 18 is acquired at step S1, and designation of a surface $S_I'$ to be inspected of the workpiece W' is received at step S2.

Figure 19:
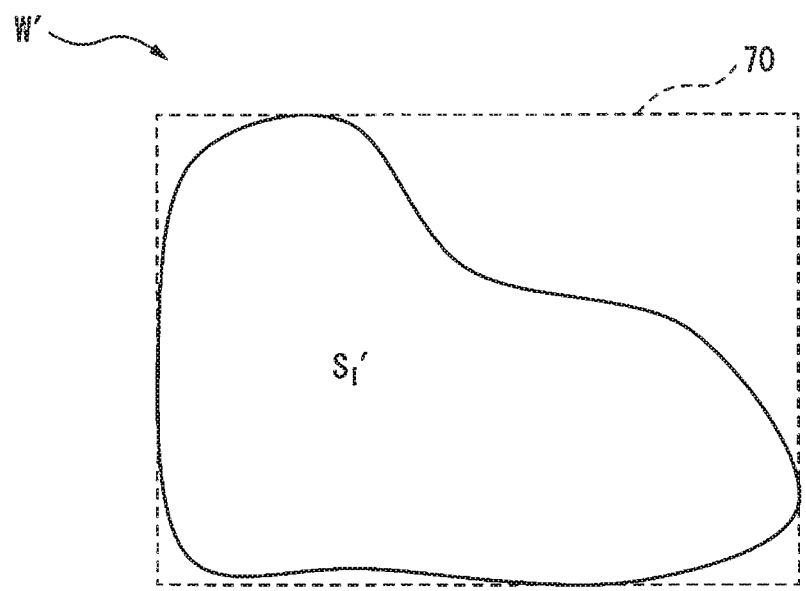
FIG. 19 is a diagram for describing step S6' in FIG. 17 and illustrates a circumscribing figure of a surface to be inspected illustrated in FIG. 18.

After step S2, the target position acquisition section 60' acquires target positions at step S6'. Specifically, the target position acquisition section 60' calculates from the drawing data of the workpiece W' a circumscribing FIG. 70 of the surface $S_I'$ to be inspected, as illustrated in FIG. 19. In this embodiment, the circumscribing FIG. 70 is a rectangle.

Figure 20:
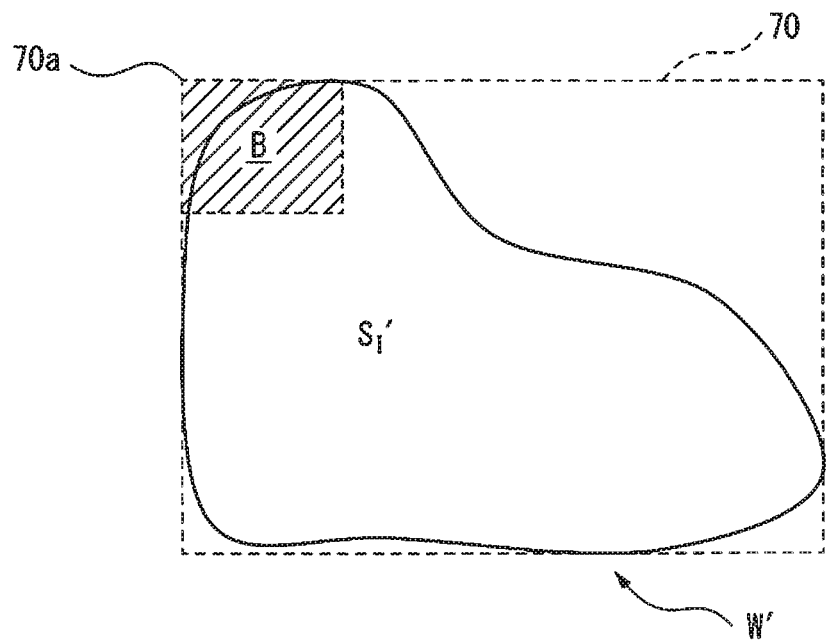
FIG. 20 is a diagram for describing step S6' in FIG. 17 and illustrates a positional relationship between a size of a field of view and the circumscribing figure when the movement mechanism is arranged at a first target position.

Then, the target position acquisition section 60' acquires a position and orientation of each component (the revolving drum 22, the robotic arm 24, the wrist 26, the robotic hand 28) of the movement mechanism 14 as a first target position $P_1$ when the movement mechanism 14 positions the workpiece W' and the imaging section 16 such that one vertex of the FOV size B of the imaging section 16, which is defined on the surface $S_I'$, coincides with one vertex 70a of the circumscribing FIG. 70 as illustrated in FIG. 20.

Figure 21:
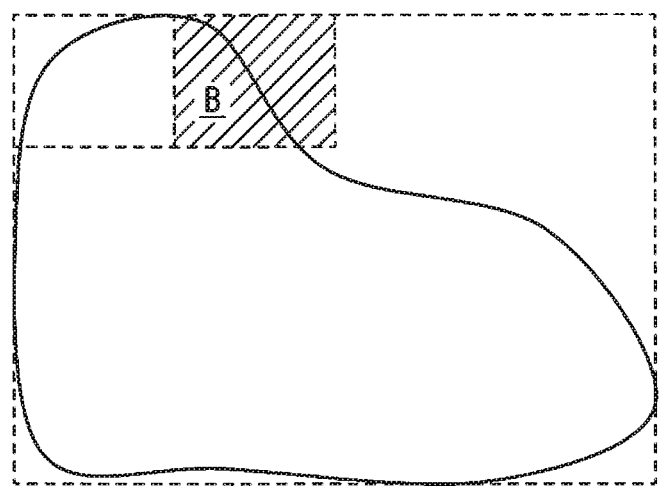
FIG. 21 is a diagram for describing step S6' in FIG. 17 and illustrates a positional relationship between the size of the field of view and the circumscribing figure when the movement mechanism is arranged at a second target position.

Then, the target position acquisition section 60' acquires a position and orientation of each component of the movement mechanism 14 as a second target position $P_2$ when the FOV size B of the imaging section 16 is shifted rightward so as to adjoin the right side of the first FOV size B corresponding to the first target position $P_1$, as illustrated in FIG. 21.

In this manner, the target position acquisition section 60' sequentially shifts the FOV size B in the circumscribing FIG. 70, and sequentially acquires a position and orientation of each component of the movement mechanism 14 as a (n+1)-th target position $P_{n+1}$ when the FOV size B is shifted so as to adjoin the right side of the previous FOV size B corresponding to a n-th target position $P_n$.

The target position acquisition section 60' automatically repeats this operation until the target position acquisition section 60' covers the entire area of the circumscribing FIG. 70, and acquires the target position $P_n$ for each position of the FOV size B. Note that, the FOV size B corresponding to the (n+1)-th target position $P_{n+1}$ may be shifted so as to partially overlap the previous FOV size B corresponding to the n-th target position $P_n$.

If there is no portion of the surface $S_I'$ in the shifted FOV size B (i.e., the surface $S_I'$ is outside the field of view of the imaging section 16) as a result of shifting the FOV size B, the target position acquisition section 60' does not calculate the target position for the shifted FOV size B.

After step S6', at step S7, the program generation section 62 generates an operation program on the basis of the target position $P_n$ acquired at step S6'. In this embodiment, the target position acquisition section 60' can acquire each target position $P_n$ on the basis of the circumscribing figure of the surface to be inspected, without setting the aforementioned representative point $D_n$.

Note that, the operation program generation device 50 illustrated in FIG. 2 or 15 may be configured as a separate component from the controller 12, similarly to the operation program generation device 50'.

Further, the number or sizes of the sections $C_n$ when dividing the surface $S_I$ at step S3 may be predetermined by the operator.

Furthermore, the shape of the section $C_n$ is not limited to a square, but may be a polygon other than a square, a circle, an ellipse, or the like. When the surface $S_I$ to be inspected is divided at step S3, in order to prevent erroneously omitting inspection, the surface $S_I$ to be inspected may be divided such that neighboring sections $C_n$ overlap with each other.

Further, the representative point setting section 56 and the representative point calculation section 58 may be omitted from the operation program generation device 50 illustrated in FIG. 2, and the target position acquisition section 60 may acquire, as the target position, the position of the movement mechanism 14 for the section $C_n$ when the workpiece W and the imaging section 16 are positioned such that each of the plurality of the sections $C_n$ is within the field of view of the imaging section 16.

For example, the target position acquisition section 60 may acquire, as the target positions, the position of the movement mechanism 14 when the workpiece W and the imaging section 16 are positioned such that the optical axis O is arranged on a diagonal line of the sections $C_n$.

In this case, the target position can be acquired for each section $C_n$ without setting the representative point. The coordinates of the diagonal line of the section $C_n$ in the robot coordinate system $C_R$ can be calculated from the drawing data of the workpiece W.

Further, the representative point $D_n$ is not necessarily a center point of the section $C_n$, and may be set at an apex angle when the section $C_n$ is a polygon, for example. Furthermore, the inspection systems 10, 10', and 100 may be configured such that the operator can finely adjust the position of the representative point $D_n$ by operating the operation part of the controller 12.

Further, at step S5, an amount of deviation in gripping position on the workpiece W may be recognized by imaging the workpiece W by the imaging section 16 in a state where the movement mechanism 14 grips the workpiece W and performing image processing on the captured image, then the position of the representative point $D_n$ in the robot coordinate system $C_R$ may be shifted by the amount of deviation.

In the aforementioned embodiment, the movement mechanism 14 is comprised of a vertical articulated robot. However, the configuration of the movement mechanism 14 is not limited to this, and the movement mechanism 14 may consist of, e.g., a loader or the like. Although the disclosure has been described above through the embodiments, the aforementioned embodiments are not intended to limit the invention according to the claims.

The invention claimed is:

1. An apparatus configured to generate an operation program for workpiece-surface inspection of an inspection system, the inspection system including
an imaging device configured to image a workpiece, and
a movement mechanism configured to position the workpiece and the imaging device relative to each other by moving the workpiece or the imaging device, the apparatus comprising at least one processor configured to:
acquire drawing data of the workpiece,
receive designation of a surface to be inspected in the drawing data,
evenly divide the surface to be inspected into a plurality of non-overlapping sections,
acquire, as a target position, a position of the movement mechanism for each of the plurality of non-overlapping sections when the workpiece and the imaging device are positioned such that said each of the plurality of non-overlapping sections to be inspected is within a field of view of the imaging device, and
generate an operation program configured to, during actual inspection of the workpiece, control a movement of the movement mechanism and an imaging of the imaging device, based on the acquired target position,
wherein the generated operation program includes an instruction causing, during the actual inspection of the workpiece, the movement mechanism to be arranged at the acquired target position at which the imaging device is caused to image the workpiece for the actual inspection.

2. The apparatus according to claim 1, wherein
the at least one processor is further configured to:
set one representative point in each of the plurality of non-overlapping sections, and
acquire, as the target position, the position of the movement mechanism for each of the plurality of non-overlapping sections when the workpiece and the imaging device are positioned such that an optical axis of the imaging device passes through the representative point of said each of the plurality of non-overlapping sections.

3. The apparatus according to claim 2, wherein
the at least one processor is configured to set, for each section among the plurality of non-overlapping sections, the representative point as a center point of the section.

4. The apparatus according to claim 2, wherein
the imaging device is fixed at a predetermined position,
the movement mechanism grips the workpiece at a predetermined workpiece position to move the workpiece, and
the at least one processor is further configured to calculate a position of the representative point in each of the plurality of non-overlapping sections, based on the workpiece position.

5. The apparatus according to claim 2, wherein
the workpiece is fixed at a predetermined position, the imaging device is moved by the movement mechanism, and
the at least one processor is further configured to calculate a position of the representative point in each of the plurality of non-overlapping sections, based on the predetermined position at which the workpiece is fixed.

6. The apparatus according to claim 1, wherein
when acquiring the target position, the at least one processor is further configured to acquire, as a further target position, a position of the movement mechanism in response to the workpiece or the imaging device being moved to change an angle of the surface to be inspected with respect to an optical axis of the imaging device, and
the at least one processor is configured to generate the operation program based on the target position and the further target position.

7. A method of generating an operation program for workpiece-surface inspection of an inspection system, the inspection system including
an imaging device configured to image a workpiece, and
a movement mechanism configured to position the workpiece and the imaging device relative to each other by moving the workpiece or the imaging device, the method comprising:
acquiring drawing data of the workpiece;
receiving designation of a surface to be inspected in the drawing data;
evenly dividing the surface to be inspected into a plurality of non-overlapping sections;
acquiring, as a target position, a position of the movement mechanism for each of the plurality of non-overlapping sections when the workpiece and the imaging device are positioned such that said each of the plurality of non-overlapping sections to be inspected is within a field of view of the imaging device; and
generating an operation program configured to, during actual inspection of the workpiece, control a movement of the movement mechanism and an imaging of the imaging device, based on the acquired target position,
wherein the generated operation program includes an instruction causing, during the actual inspection of the workpiece, the movement mechanism to be arranged at the acquired target position at which the imaging device is caused to image the workpiece for the actual inspection.

8. The method according to claim 7, wherein
the drawing data include CAD data of the workpiece.

9. The method according to claim 7, wherein
the drawing data include a model of the workpiece.

10. The apparatus according to claim 1, wherein
the drawing data include CAD data of the workpiece.

11. The apparatus according to claim 1, wherein
the drawing data include a model of the workpiece.

* * * * *